United States Patent
Fakoorian et al.

(10) Patent No.: US 11,963,209 B2
(45) Date of Patent: Apr. 16, 2024

(54) DOWNLINK CONTROL INDICATOR (DCI) MONITORING AND SEMI-PERSISTENT SCHEDULING (SPS) RECEPTION WITH LIMITED CAPABILITY DEVICES

(71) Applicant: QUALCOMM Incorporated, San Diego, CA (US)

(72) Inventors: Seyed Ali Akbar Fakoorian, San Diego, CA (US); Wei Yang, San Diego, CA (US); Peter Gaal, San Diego, CA (US); Seyedkianoush Hosseini, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 119 days.

(21) Appl. No.: 17/183,559

(22) Filed: Feb. 24, 2021

(65) Prior Publication Data

US 2021/0274519 A1    Sep. 2, 2021

Related U.S. Application Data

(60) Provisional application No. 63/025,588, filed on May 15, 2020, provisional application No. 63/008,613, (Continued)

(51) Int. Cl.
*H04W 72/50*    (2023.01)
*H04L 5/00*    (2006.01)
(Continued)

(52) U.S. Cl.
CPC ......... *H04W 72/535* (2023.01); *H04L 5/0055* (2013.01); *H04W 24/08* (2013.01); (Continued)

(58) Field of Classification Search
CPC ............. H04W 72/1257; H04W 24/08; H04W 72/0446; H04W 72/1289; H04W 72/14; (Continued)

(56) References Cited

U.S. PATENT DOCUMENTS

| 2010/0195629 A1* | 8/2010 | Chen ................. H04L 1/1664 |
| | | 370/336 |
| 2011/0223924 A1* | 9/2011 | Lohr ................... H04W 72/23 |
| | | 455/450 |

(Continued)

FOREIGN PATENT DOCUMENTS

| EP | 2709299 A2 | 3/2014 |
| EP | 3030029 A1 | 6/2016 |

OTHER PUBLICATIONS

International Search Report and Written Opinion—PCT/US2021/019520—ISA/EPO—dated Jun. 11, 2021.

(Continued)

*Primary Examiner* — Chirag G Shah
*Assistant Examiner* — Joshua Smith
(74) *Attorney, Agent, or Firm* — Haynes and Boone, LLP/Qualcomm Incorporated

(57) ABSTRACT

Wireless communication devices, systems, and methods related to downlink control information (DCI) monitoring and semi-persistent scheduling (SPS) reception for limited capability devices are provided. For example, a method of wireless communication performed by a user equipment can include receiving, from the base station, a semi-persistent scheduling (SPS) grant, the SPS grant indicating a periodicity; monitoring, in a slot scheduled for a downlink data communication, for an SPS release and the downlink data communication; and transmitting, to the base station, an acknowledgement (ACK) or negative acknowledgment (NACK) based on the monitoring.

25 Claims, 15 Drawing Sheets

Related U.S. Application Data filed on Apr. 10, 2020, provisional application No. 62/983,571, filed on Feb. 28, 2020.

(51) Int. Cl.
- *H04W 24/08* (2009.01)
- *H04W 72/0446* (2023.01)
- *H04W 72/23* (2023.01)
- *H04W 76/36* (2018.01)

(52) U.S. Cl.
CPC ....... *H04W 72/0446* (2013.01); *H04W 72/23* (2023.01); *H04W 76/36* (2018.02)

(58) Field of Classification Search
CPC .. H04W 76/36; H04W 72/042; H04L 5/0055; H04L 1/1854; H04L 5/0044; H04L 5/0078; H04L 5/0096; H04L 5/0053
See application file for complete search history.

(56) References Cited

U.S. PATENT DOCUMENTS

| | | | | |
|---|---|---|---|---|
| 2013/0265914 A1* | 10/2013 | Ahn | ............... | H04W 72/0446 370/280 |
| 2018/0139767 A1* | 5/2018 | Lee | ............... | H04W 72/0446 |
| 2020/0267597 A1* | 8/2020 | Huang | ............... | H04W 72/1289 |
| 2021/0153204 A1* | 5/2021 | Takeda | ............... | H04W 72/0446 |
| 2022/0061073 A1* | 2/2022 | Yang | ............... | H04W 72/542 |
| 2022/0070900 A1* | 3/2022 | Yin | ............... | H04W 72/0446 |
| 2022/0174693 A1* | 6/2022 | Takeda | ............... | H04L 5/0053 |
| 2022/0239445 A1* | 7/2022 | Yoshioka | ............ | H04L 5/0055 |
| 2022/0338225 A1* | 10/2022 | Takahashi | ............ | H04L 5/0053 |

OTHER PUBLICATIONS

LG Electronics Inc: "Need for Feedback of SPS Activation/Release", 3GPP Draft, R2-156756, 3GPP TSG-RAN WG2 Meeting #92, Need for Feedback of SPS Activation-Release, 3rd Generation Partnership Project (3GPP), Mobile Competence Centre, 650, Route Des Lucioles, F-06921 Sophia-Antipolis Cedex, Fran, vol. RAN WG2, No. Anehaim, USA, Nov 16, 2015-Nov. 20, 2015, Nov. 16, 2015 (Nov. 16, 2015), XP051040415, pp. 1-3, Retrieved from the Internet: URL:http://www.3gpp.org/ftp/Meetings_3GPP_SYNC/RAN2/Docs/ [retrieved on Nov. 16, 2015] Paragraph [0001].

Nokia, et al., "Maintenance of Rel-16 URLLC/IIoT SPS Enhancements", 3GPP Draft, R1-2000407, 3GPP TSG RAN WG1 Meeting #100, 3rd Generation Partnership Project (3GPP), Mobile Competence Centre, 650, Route Des Lucioles, F-06921 Sophia-Antipolis Cedex, France, vol. RAN WG1, No. e-Meeting, Feb. 24, 2020-Mar. 6, 2020, Feb. 14, 2020 (Feb. 14, 2020), XP051852851, 5 Pages, Retrieved from the Internet: URL:https://ftp.3gpp.org/tsg_ran/WG1_RL1/TSGR1_100_e/Docs/R1-2000407.zip R1-2000407_7.2.5.7_RE[retrieved on Feb. 14, 2020] Paragraph [02.2].

* cited by examiner

DOWNLINK CONTROL INDICATOR (DCI) MONITORING AND SEMI-PERSISTENT SCHEDULING (SPS) RECEPTION WITH LIMITED CAPABILITY DEVICES

CROSS-REFERENCE TO RELATED APPLICATIONS

The present application claims priority to and the benefit of the U.S. Provisional Patent Application No. 62/983,571, filed Feb. 28, 2020; U.S. Provisional Patent Application No. 63/008,613, filed Apr. 10, 2020; and U.S. Provisional Patent Application No. 63/025,588, filed May 15, 2020, all three titled "Downlink Control Indicator (DCI) Monitoring and Semi-Persistent Scheduling (SPS) Reception with Limited Capability Devices," which are hereby incorporated by reference in their entireties as if fully set forth below and for all applicable purposes.

TECHNICAL FIELD

The technology discussed herein relates generally to wireless communication systems, and more particularly to downlink scheduling techniques, including semi-persistent scheduling (SPS) grants and releases, suitable for use by limited capability devices as well as non-limited capability devices.

INTRODUCTION

In wireless communication systems that operate in accordance to 3GPP Releases 15 and 16, transmissions over one or more channels are scheduled to permit multiple devices to communicate using the one or more channels. Scheduling is the process of allocating resources for transmitting data. New radio (NR) scheduling is dictated by network (e.g., gNodeB or gNB) and the user equipment (UE) just follows the schedule the network indicates. The overall scheduling mechanism in NR is similar to long-term evolution (LTE) scheduling, but NR has finer granularity than LTE especially in terms of time domain scheduling at the physical layer. There are two types of scheduling for downlink communications (e.g., from a gNodeB to a UE). One is called "Dynamic Scheduling" and the other one SPS (Semi Persistent Scheduling). Dynamic scheduling is the mechanism in which each and every Physical Downlink Shared Channel (PDSCH) is scheduled by a Downlink Control Indicator or Downlink Control Information (DCI). SPS is the mechanism in which the PDSCH transmission is scheduled by an RRC message (or DCI). The PDSCH is divided into slots, in which data is transmitted.

User data traffic is transmitted, between a gNodeB and a UE, in a physical downlink shared channel (PDSCH), and the UE transmits a requisite acknowledgement/negative-acknowledgment (ACK/NACK) report at a specified time on the uplink channels.

In 3GPP Release 15, if the UE does not indicate a capability to receive more than one unicast PDSCH per slot, then the UE does not expect to a receive SPS PDSCH Release indicator and unicast PDSCH symbol in a same slot. However, 3GPP Release 16 defines SPS configurations with a minimum periodicity of one slot. In this specification, under Type-1 CB construction, it is not possible to release SPS in the same slot that limited capability UE is configured to receive an SPS PDSCH symbol. For instance, the UE may not be able receive both a unicast PDSCH symbol and an SPS Release indicator in the same slot because it would be unable send an ACK/NACK within the slot for both the unicast PDSCH symbol and the SPS Release indicator. Therefore, solutions are needed to permit a UE to receive a SPS Release indicator within a slot having a downlink communication (e.g., unicast PDSCH associated with a dynamic grant and/or an SPS grant) scheduled for the UE.

BRIEF SUMMARY OF SOME EXAMPLES

The following summarizes some aspects of the present disclosure to provide a basic understanding of the discussed technology. This summary is not an extensive overview of all contemplated features of the disclosure and is intended neither to identify key or critical elements of all aspects of the disclosure nor to delineate the scope of any or all aspects of the disclosure. Its sole purpose is to present some concepts of one or more aspects of the disclosure in summary form as a prelude to the more detailed description that is presented later.

Semi-persistent scheduling (SPS) can be used to reduce the control channel overhead for communications that require radio resource allocations with regularly scheduled interval, such as voice, video, gaming, etc. In this regard, an SPS grant can indicate to a UE the allocated radio resources and associated periodicity. The periodicity of the SPS grant can range from 1 slot (or sub-slot) to 1 second or longer, including any values in between. The specific periodicity can be dictated by the type of data being communicated and its associated communication interval requirements.

Aspects of the present disclosure provide mechanisms for permitting a UE to receive an SPS release within a slot having a scheduled downlink data communication (e.g., a unicast PDSCH associated with a dynamic grant and/or an SPS grant) for the UE. In some instances, the UE is a limited capability device that is configured to receive a single physical downlink shared channel (PDSCH) communication per slot. In this regard, the UE may be configured to only provide a single ACK/NACK per slot. Accordingly, where a limited capability UE is sent a SPS release in a slot that is also scheduled for a downlink data communication, the UE cannot provide an ACK/NACK for both the SPS release and the scheduled downlink data. Relatedly, if the limited capability UE is assigned an SPS grant with a periodicity of 1 slot, then the UE will be scheduled to receive a downlink data communication in every slot. In such a case, although the limited capability UE may be able to monitor for the SPS release (in PDCCH) and the downlink data communication (in PDSCH) in a particular slot, it may be unable to provide an ACK/NACK for both of them. Aspects of the present disclosure provide solutions to these and other scenarios associated with processing an SPS release in a slot (or sub-slot) scheduled for a downlink data communication. While aspects of the present disclosure have particular benefits in the context of limited capability UEs, it is understood that the concepts can be applied in a similar manner to fully capable UEs to achieve similar benefits. In this regard, some aspects of the present disclosure are particularly suited for fully capable UEs (e.g., a UE that can receive multiple PDSCH communications per slot and provide multiple associated ACK/NACKs).

In an aspect of the disclosure, a method of wireless communication performed by a user equipment includes receiving, from the base station, a semi-persistent scheduling (SPS) grant, the SPS grant indicating a periodicity; monitoring, in a slot scheduled for a downlink data communication, for an SPS release and the downlink data communication; and transmitting, to the base station, an acknowledgement (ACK) or negative acknowledgment (NACK) based on the monitoring.

In an additional aspect of the disclosure, a method of wireless communication performed by a base station includes transmitting, to the user equipment, a semi-persistent scheduling (SPS) grant, the SPS grant indicating a periodicity; transmitting, in a slot scheduled for a downlink data communication for the user equipment, an SPS release; and monitoring for an acknowledgement (ACK) or negative acknowledgment (NACK) from the user equipment for the slot.

In an additional aspect of the disclosure, a user equipment includes a transceiver configured to: receive, from the base station, a semi-persistent scheduling (SPS) grant, the SPS grant indicating a periodicity; and a processor in communication with the transceiver, the processor configured to: monitor, in a slot scheduled for a downlink data communication, for an SPS release and the downlink data communication; wherein the transceiver is further configured to transmit, to the base station, an acknowledgement (ACK) or negative acknowledgment (NACK) based on the monitoring.

In an additional aspect of the disclosure, a base station includes a transceiver configured to: transmit, to the user equipment, a semi-persistent scheduling (SPS) grant, the SPS grant indicating a periodicity; and transmit, in a slot scheduled for a downlink data communication for the user equipment, an SPS release; and a processor in communication with the transceiver, the processor configured to: monitor for an acknowledgement (ACK) or negative acknowledgment (NACK) from the user equipment for the slot.

In an additional aspect of the disclosure, a user equipment includes means for receiving, from the base station, a semi-persistent scheduling (SPS) grant, the SPS grant indicating a periodicity; means for monitoring, in a slot scheduled for a downlink data communication, for an SPS release and the downlink data communication; and means for transmitting, to the base station, an acknowledgement (ACK) or negative acknowledgment (NACK) based on the monitoring.

In an additional aspect of the disclosure, a base station includes means for transmitting, to the user equipment, a semi-persistent scheduling (SPS) grant, the SPS grant indicating a periodicity; means for transmitting, in a slot scheduled for a downlink data communication for the user equipment, an SPS release; and means for monitoring for an acknowledgement (ACK) or negative acknowledgment (NACK) from the user equipment for the slot.

In an additional aspect of the disclosure, a non-transitory computer-readable medium has program code recorded thereon for wireless communication by a user equipment, the program code including code for causing the user equipment to receive, from the base station, a semi-persistent scheduling (SPS) grant, the SPS grant indicating a periodicity; code for causing the user equipment to monitor, in a slot scheduled for a downlink data communication, for an SPS release and the downlink data communication; and code for causing the user equipment to transmit, to the base station, an acknowledgement (ACK) or negative acknowledgment (NACK) based on the monitoring.

In an additional aspect of the disclosure, a non-transitory computer-readable medium has program code recorded thereon for wireless communication by a base station, the program code including code for causing the base station to transmit, to the user equipment, a semi-persistent scheduling (SPS) grant, the SPS grant indicating a periodicity; code for causing the base station to transmit, in a slot scheduled for a downlink data communication for the user equipment, an SPS release; and code for causing the base station to monitor for an acknowledgement (ACK) or negative acknowledgment (NACK) from the user equipment for the slot.

Other aspects, features, and advantages of the present invention will become apparent to those of ordinary skill in the art, upon reviewing the following description of specific, exemplary embodiments of the present invention in conjunction with the accompanying figures. While features of the present invention may be discussed relative to certain examples and figures below, all embodiments of the present invention can include one or more of the advantageous features discussed herein. In other words, while one or more embodiments may be discussed as having certain advantageous features, one or more of such features may also be used in accordance with the various other embodiments of the invention discussed herein. In similar fashion, while exemplary embodiments may be discussed below as device, system, or method embodiments, it should be understood that such exemplary embodiments can be implemented in various devices, systems, and methods.

DETAILED DESCRIPTION

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

While aspects and embodiments are described in this application by illustration to some examples, those skilled in the art will understand that additional implementations and use cases may come about in many different arrangements and scenarios. Innovations described herein may be implemented across many differing platform types, devices, systems, shapes, sizes, packaging arrangements. For example, embodiments and/or uses may come about via integrated chip embodiments and other non-module-component based devices (e.g., end-user devices, vehicles, communication devices, computing devices, industrial equipment, retail/purchasing devices, medical devices, AI-enabled devices, etc.). While some examples may or may not be specifically directed to use cases or applications, a wide assortment of applicability of described innovations may occur. Implementations may range a spectrum from chip-level or modular components to non-modular, non-chip-level implementations and further to aggregate, distributed, or OEM devices or systems incorporating one or more aspects of the described innovations. In some practical settings, devices incorporating described aspects and features may also necessarily include additional components and features for implementation and practice of claimed and described embodiments. For example, transmission and reception of wireless signals necessarily includes a number of components for analog and digital purposes (e.g., hardware components including antenna, RF-chains, power amplifiers, modulators, buffer, processor(s), interleaver, adders/summers, etc.). It is intended that innovations described herein may be practiced in a wide variety of devices, chip-level components, systems, distributed arrangements, end-user devices, etc. of varying sizes, shapes and constitution.

Figure 1:
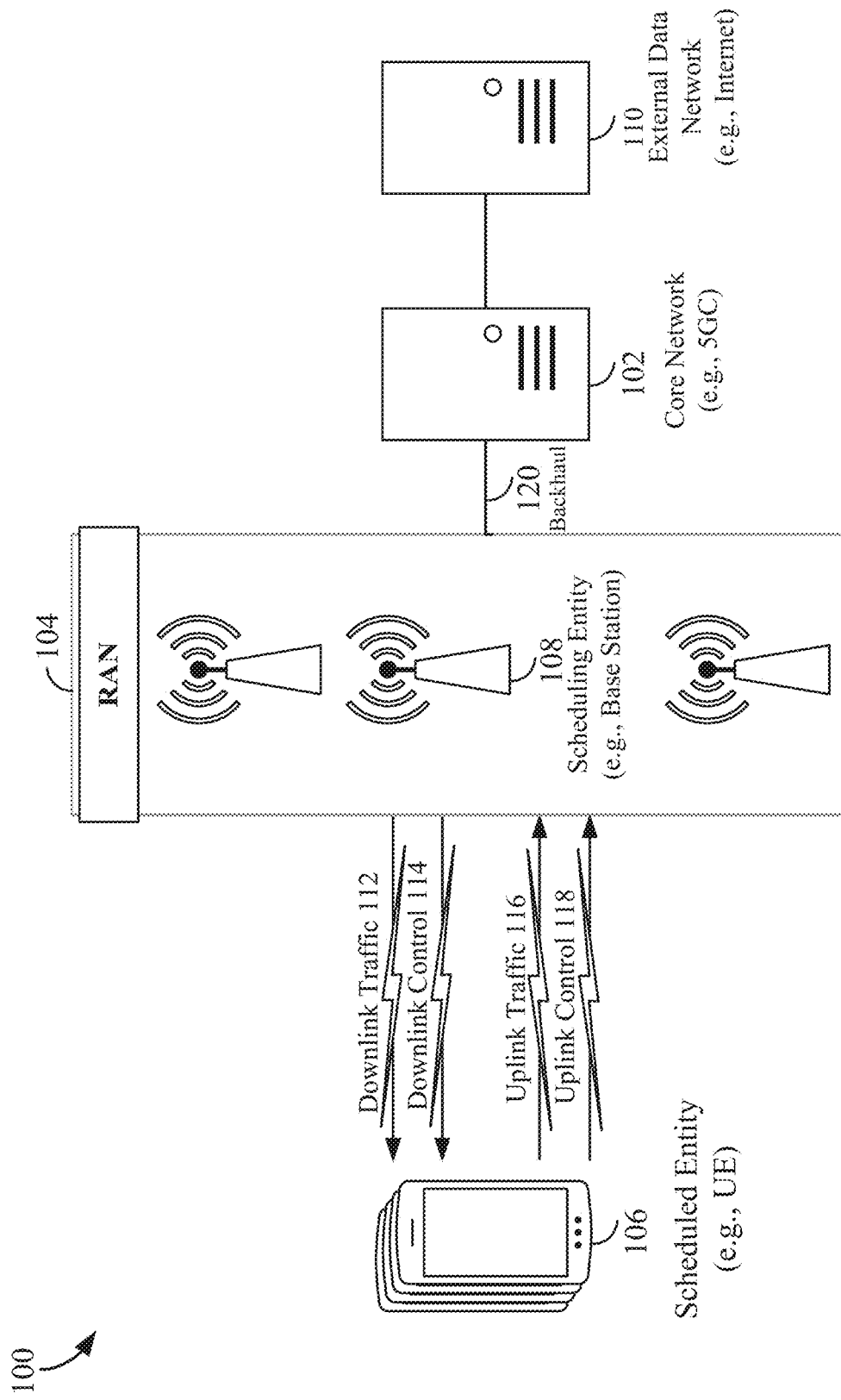
FIG. 1 is a schematic illustration of a wireless communication system.

The various concepts presented throughout this disclosure may be implemented across a broad variety of telecommunication systems, network architectures, and communication standards. Referring now to FIG. 1, as an illustrative example without limitation, various aspects of the present disclosure are illustrated with reference to a wireless communication system 100. The wireless communication system 100 includes three interacting domains: a core network 102, a radio access network (RAN) 104, and a user equipment (UE) 106. By virtue of the wireless communication system 100, the UE 106 may be enabled to carry out data communication with an external data network 110, such as (but not limited to) the Internet.

The RAN 104 may implement any suitable wireless communication technology or technologies to provide radio access to the UE 106. As one example, the RAN 104 may operate according to 3rd Generation Partnership Project (3GPP) New Radio (NR) specifications, often referred to as 5G. As another example, the RAN 104 may operate under a hybrid of 5G NR and Evolved Universal Terrestrial Radio Access Network (eUTRAN) standards, often referred to as LTE. The 3GPP refers to this hybrid RAN as a next-generation RAN, or NG-RAN. Of course, many other examples may be utilized within the scope of the present disclosure.

As illustrated, the RAN 104 includes a plurality of base stations 108. Broadly, a base station is a network element in a radio access network responsible for radio transmission and reception in one or more cells to or from a UE. In different technologies, standards, or contexts, a base station may variously be referred to by those skilled in the art as a base transceiver station (BTS), a radio base station, a radio transceiver, a transceiver function, a basic service set (BSS), an extended service set (ESS), an access point (AP), a Node B (NB), an eNode B (eNB), a gNode B (gNB), or some other suitable terminology.

The radio access network 104 is further illustrated supporting wireless communication for multiple mobile apparatuses. A mobile apparatus may be referred to as user equipment (UE) in 3GPP standards, but may also be referred to by those skilled in the art as a mobile station (MS), a subscriber station, a mobile unit, a subscriber unit, a wireless unit, a remote unit, a mobile device, a wireless device, a wireless communications device, a remote device, a mobile subscriber station, an access terminal (AT), a mobile terminal, a wireless terminal, a remote terminal, a handset, a terminal, a user agent, a mobile client, a client, or some other suitable terminology. A UE may be an apparatus that provides a user with access to network services.

Within the present document, a "mobile" apparatus need not necessarily have a capability to move, and may be stationary. The term mobile apparatus or mobile device broadly refers to a diverse array of devices and technologies. UEs may include a number of hardware structural components sized, shaped, and arranged to help in communication; such components can include antennas, antenna arrays, RF chains, amplifiers, one or more processors, etc. electrically coupled to each other. For example, some non-limiting examples of a mobile apparatus include a mobile, a cellular (cell) phone, a smart phone, a session initiation protocol (SIP) phone, a laptop, a personal computer (PC), a notebook, a netbook, a smartbook, a tablet, a personal digital assistant (PDA), and a broad array of embedded systems, e.g., corresponding to an "Internet of things" (IoT). A mobile apparatus may additionally be an automotive or other transportation vehicle, a remote sensor or actuator, a robot or robotics device, a satellite radio, a global positioning system (GPS) device, an object tracking device, a drone, a multicopter, a quad-copter, a remote control device, a consumer and/or wearable device, such as eyewear, a wearable camera, a virtual reality device, a smart watch, a health or fitness tracker, a digital audio player (e.g., MP3 player), a camera, a game console, etc. A mobile apparatus may additionally be a digital home or smart home device such as a home audio, video, and/or multimedia device, an appliance, a vending machine, intelligent lighting, a home security system, a smart meter, etc. A mobile apparatus may additionally be a smart energy device, a security device, a solar panel or solar array, a municipal infrastructure device controlling electric power (e.g., a smart grid), lighting, water, etc.; an industrial automation and enterprise device; a logistics controller; agricultural equipment; military defense equipment, vehicles, aircraft, ships, and weaponry, etc. Still further, a mobile apparatus may provide for connected medicine or telemedicine support, e.g., health care at a distance. Telehealth devices may include telehealth monitoring devices and telehealth administration devices, whose communication may be given preferential treatment or prioritized access over other types of information, e.g., in terms of prioritized access for transport of critical service data, and/or relevant QoS for transport of critical service data.

Wireless communication between a RAN 104 and a UE 106 may be described as utilizing an air interface. Transmissions over the air interface from a base station (e.g., base station 108) to one or more UEs (e.g., UE 106) may be referred to as downlink (DL) transmission. In accordance with certain aspects of the present disclosure, the term downlink may refer to a point-to-multipoint transmission originating at a scheduling entity (described further below; e.g., base station 108). Another way to describe this scheme may be to use the term broadcast channel multiplexing. Transmissions from a UE (e.g., UE 106) to a base station (e.g., base station 108) may be referred to as uplink (UL) transmissions. In accordance with further aspects of the present disclosure, the term uplink may refer to a point-to-point transmission originating at a scheduled entity (described further below; e.g., UE 106).

In some examples, access to the air interface may be scheduled, wherein a scheduling entity (e.g., a base station 108) allocates resources for communication among some or all devices and equipment within its service area or cell. Within the present disclosure, as discussed further below, the scheduling entity may be responsible for scheduling, assigning, reconfiguring, and releasing resources for one or more scheduled entities. That is, for scheduled communication, UEs 106, which may be scheduled entities, may utilize resources allocated by the scheduling entity 108.

Base stations 108 are not the only entities that may function as scheduling entities. That is, in some examples, a UE may function as a scheduling entity, scheduling resources for one or more scheduled entities (e.g., one or more other UEs).

As illustrated in FIG. 1, a scheduling entity 108 may broadcast downlink traffic 112 to one or more scheduled entities 106. Broadly, the scheduling entity 108 is a node or device responsible for scheduling traffic in a wireless communication network, including the downlink traffic 112 and, in some examples, uplink traffic 116 from one or more scheduled entities 106 to the scheduling entity 108. On the other hand, the scheduled entity 106 is a node or device that receives downlink control information 114, including but not limited to scheduling information (e.g., a grant), synchronization or timing information, or other control information from another entity in the wireless communication network such as the scheduling entity 108.

In general, base stations 108 may include a backhaul interface for communication with a backhaul portion 120 of the wireless communication system. The backhaul 120 may provide a link between a base station 108 and the core network 102. Further, in some examples, a backhaul network may provide interconnection between the respective base stations 108. Various types of back-haul interfaces may be employed, such as a direct physical connection, a virtual network, or the like using any suitable transport network.

The core network 102 may be a part of the wireless communication system 100, and may be independent of the radio access technology used in the RAN 104. In some examples, the core network 102 may be configured according to 5G standards (e.g., 5GC). In other examples, the core network 102 may be configured according to a 4G evolved packet core (EPC), or any other suitable standard or configuration.

Figure 2:
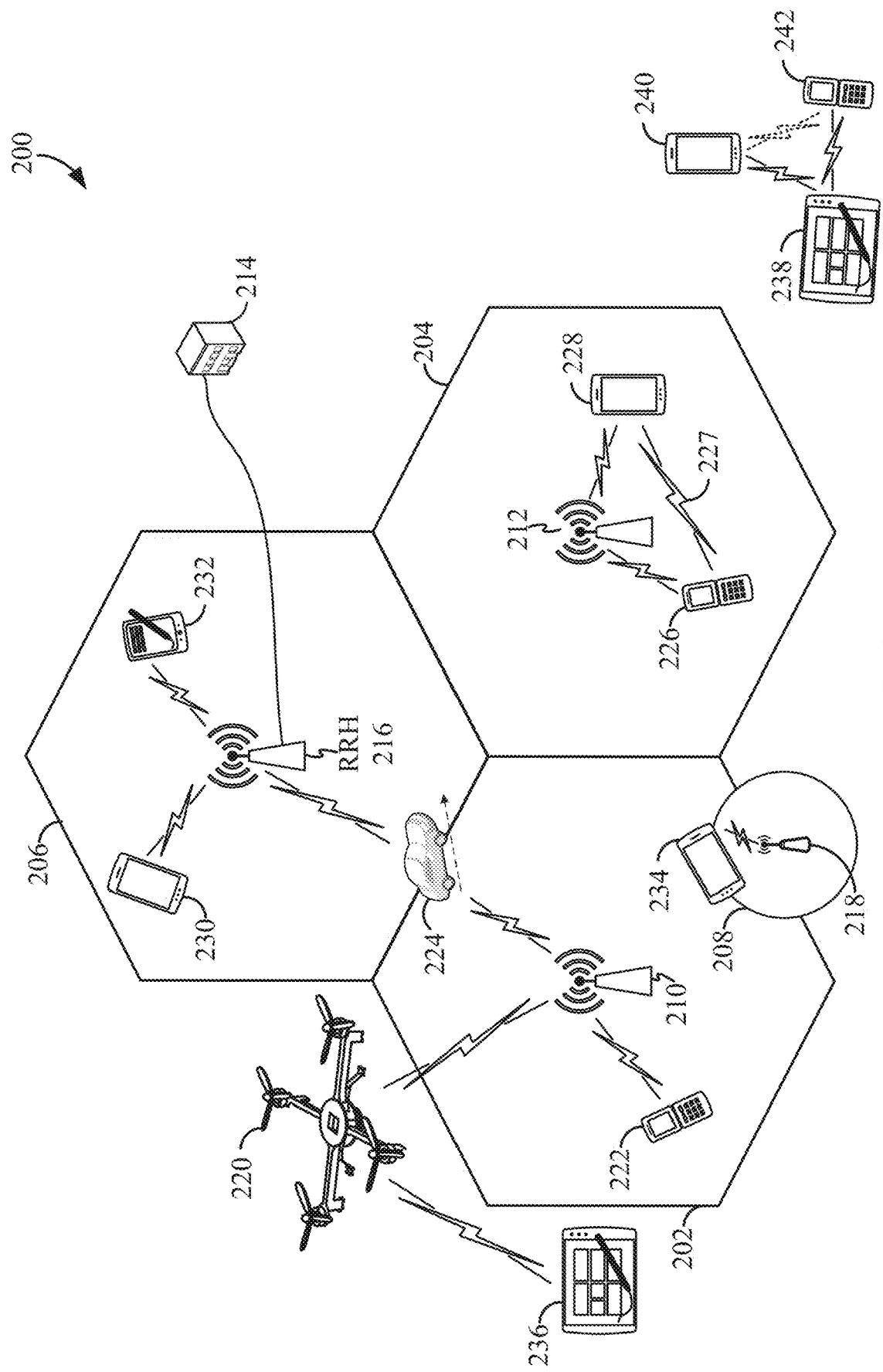
FIG. 2 is a conceptual illustration of an example of a radio access network.

Referring now to FIG. 2, by way of example and without limitation, a schematic illustration of a RAN 200 is provided. In some examples, the RAN 200 may be the same as the RAN 104 described above and illustrated in FIG. 1. The geographic area covered by the RAN 200 may be divided into cellular regions (cells) that can be uniquely identified by a user equipment (UE) based on an identification broadcasted from one access point or base station. FIG. 2 illustrates macrocells 202, 204, and 206, and a small cell 208, each of which may include one or more sectors (not shown). A sector is a sub-area of a cell. All sectors within one cell are served by the same base station. A radio link within a sector can be identified by a single logical identification belonging to that sector. In a cell that is divided into sectors, the multiple sectors within a cell can be formed by groups of antennas with each antenna responsible for communication with UEs in a portion of the cell.

In FIG. 2, two base stations 210 and 212 are shown in cells 202 and 204; and a third base station 214 is shown controlling a remote radio head (RRH) 216 in cell 206. That is, a base station can have an integrated antenna or can be connected to an antenna or RRH by feeder cables. In the illustrated example, the cells 202, 204, and 126 may be referred to as macrocells, as the base stations 210, 212, and 214 support cells having a large size. Further, a base station 218 is shown in the small cell 208 (e.g., a microcell, picocell, femtocell, home base station, home Node B, home eNode B, gNode B or gNB, etc.) which may overlap with one or more macrocells. In this example, the cell 208 may be referred to as a small cell, as the base station 218 supports a cell having a relatively small size. Cell sizing can be done according to system design as well as component constraints.

It is to be understood that the radio access network 200 may include any number of wireless base stations and cells. Further, a relay node may be deployed to extend the size or coverage area of a given cell. The base stations 210, 212, 214, 218 provide wireless access points to a core network for any number of mobile apparatuses. In some examples, the base stations 210, 212, 214, and/or 218 may be the same as the base station/scheduling entity 108 described above and illustrated in FIG. 1.

FIG. 2 further includes a quadcopter or drone 220, which may be configured to function as a base station. That is, in some examples, a cell may not necessarily be stationary, and the geographic area of the cell may move according to the location of a mobile base station such as the quadcopter 220.

Within the RAN 200, the cells may include UEs that may be in communication with one or more sectors of each cell. Further, each base station 210, 212, 214, 218, and 220 may be configured to provide an access point to a core network 102 (see FIG. 1) for all the UEs in the respective cells. For example, UEs 222 and 224 may be in communication with base station 210; UEs 226 and 228 may be in communication with base station 212; UEs 230 and 232 may be in communication with base station 214 by way of RRH 216; UE 234 may be in communication with base station 218; and UE 236 may be in communication with mobile base station 220. In some examples, the UEs 222, 224, 226, 228, 230, 232, 234, 236, 238, 240, and/or 242 may be the same as the UE/scheduled entity 106 described above and illustrated in FIG. 1.

In some examples, a mobile network node (e.g., quadcopter 220) may be configured to function as a UE. For example, the quadcopter 220 may operate within cell 202 by communicating with base station 210.

In a further aspect of the RAN 200, sidelink signals may be used between UEs without necessarily relying on scheduling or control information from a base station. For example, two or more UEs (e.g., UEs 226 and 228) may communicate with each other using peer to peer (P2P) or sidelink signals 227 without relaying that communication through a base station (e.g., base station 212). In a further example, UE 238 is illustrated communicating with UEs 240 and 242. Here, the UE 238 may function as a scheduling entity or a primary sidelink device, and UEs 240 and 242 may function as a scheduled entity or a non-primary (e.g., secondary) sidelink device. In still another example, a UE may function as a scheduling entity in a device-to-device (D2D), peer-to-peer (P2P), or vehicle-to-vehicle (V2V) network, and/or in a mesh network. In a mesh network example, UEs 240 and 242 may optionally communicate directly with one another in addition to communicating with the scheduling entity 238. Thus, in a wireless communication system with scheduled access to time-frequency resources and having a cellular configuration, a P2P configuration, or a mesh configuration, a scheduling entity and one or more scheduled entities may communicate utilizing the scheduled resources.

In the radio access network 200, the ability for a UE to communicate while moving, independent of its location, is referred to as mobility. The various physical channels between the UE and the radio access network are generally set up, maintained, and released under the control of an access and mobility management function (AMF, not illustrated, part of the core network 102 in FIG. 1), which may include a security context management function (SCMF) that manages the security context for both the control plane and the user plane functionality, and a security anchor function (SEAF) that performs authentication.

In various aspects of the disclosure, a radio access network 200 may utilize DL-based mobility or UL-based mobility to enable mobility and handovers (i.e., the transfer of a UE's connection from one radio channel to another). In a network configured for DL-based mobility, during a call with a scheduling entity, or at any other time, a UE may monitor various parameters of the signal from its serving cell as well as various parameters of neighboring cells. Depending on the quality of these parameters, the UE may maintain communication with one or more of the neighboring cells. During this time, if the UE moves from one cell to another, or if signal quality from a neighboring cell exceeds that from the serving cell for a given amount of time, the UE may undertake a handoff or handover from the serving cell to the neighboring (target) cell. For example, UE 224 (illustrated as a vehicle, although any suitable form of UE may be used) may move from the geographic area corresponding to its serving cell 202 to the geographic area corresponding to a neighbor cell 206. When the signal strength or quality from the neighbor cell 206 exceeds that of its serving cell 202 for a given amount of time, the UE 224 may transmit a reporting message to its serving base station 210 indicating this condition. In response, the UE 224 may receive a handover command, and the UE may undergo a handover to the cell 206.

In a network configured for UL-based mobility, UL reference signals from each UE may be utilized by the network to select a serving cell for each UE. In some examples, the base stations 210, 212, and 214/216 may broadcast unified synchronization signals (e.g., unified Primary Synchronization Signals (PSSs), unified Secondary Synchronization Signals (SSSs) and unified Physical Broadcast Channels (PBCH)). The UEs 222, 224, 226, 228, 230, and 232 may receive the unified synchronization signals, derive the carrier frequency and slot timing from the synchronization signals, and in response to deriving timing, transmit an uplink pilot or reference signal. The uplink pilot signal transmitted by a UE (e.g., UE 224) may be concurrently received by two or more cells (e.g., base stations 210 and 214/216) within the radio access network 200. Each of the cells may measure a strength of the pilot signal, and the radio access network (e.g., one or more of the base stations 210 and 214/216 and/or a central node within the core network) may determine a serving cell for the UE 224. As the UE 224 moves through the radio access network 200, the network may continue to monitor the uplink pilot signal transmitted by the UE 224. When the signal strength or quality of the pilot signal measured by a neighboring cell exceeds that of the signal strength or quality measured by the serving cell, the network 200 may handover the UE 224 from the serving cell to the neighboring cell, with or without informing the UE 224.

Although the synchronization signal transmitted by the base stations 210, 212, and 214/216 may be unified, the synchronization signal may not identify a particular cell, but rather may identify a zone of multiple cells operating on the same frequency and/or with the same timing. The use of zones in 5G networks or other next generation communication networks enables the uplink-based mobility framework and improves the efficiency of both the UE and the network, since the number of mobility messages that need to be exchanged between the UE and the network may be reduced.

In various implementations, the air interface in the radio access network 200 may utilize licensed spectrum, unlicensed spectrum, or shared spectrum. Licensed spectrum provides for exclusive use of a portion of the spectrum, generally by virtue of a mobile network operator purchasing a license from a government regulatory body. Unlicensed spectrum provides for shared use of a portion of the spectrum without need for a government-granted license. While compliance with some technical rules is generally still required to access unlicensed spectrum, generally, any operator or device may gain access. Shared spectrum may fall between licensed and unlicensed spectrum, wherein technical rules or limitations may be required to access the spectrum, but the spectrum may still be shared by multiple operators and/or multiple RATs. For example, the holder of a license for a portion of licensed spectrum may provide licensed shared access (LSA) to share that spectrum with other parties, e.g., with suitable licensee-determined conditions to gain access.

The air interface in the radio access network 200 may utilize one or more duplexing algorithms. Duplex refers to a point-to-point communication link where both endpoints can communicate with one another in both directions. Full duplex means both endpoints can simultaneously communicate with one another. Half duplex means only one endpoint can send information to the other at a time. In a wireless link, a full duplex channel generally relies on physical isolation of a transmitter and receiver, and suitable interference cancellation technologies. Full duplex emulation is frequently implemented for wireless links by utilizing frequency division duplex (FDD) or time division duplex (TDD). In FDD, transmissions in different directions operate at different carrier frequencies. In TDD, transmissions in different directions on a given channel are separated from one another using time division multiplexing. That is, at some times the channel is dedicated for transmissions in one direction, while at other times the channel is dedicated for transmissions in the other direction, where the direction may change very rapidly, e.g., several times per slot.

The air interface in the radio access network 200 may utilize one or more multiplexing and multiple access algorithms to enable simultaneous communication of the various devices. For example, 5G NR specifications provide multiple access for UL transmissions from UEs 222 and 224 to base station 210, and for multiplexing for DL transmissions from base station 210 to one or more UEs 222 and 224, utilizing orthogonal frequency division multiplexing (OFDM) with a cyclic prefix (CP). In addition, for UL transmissions, 5G NR specifications provide support for discrete Fourier transform-spread-OFDM (DFT-s-OFDM) with a CP (also referred to as single-carrier FDMA (SC-FDMA)). However, within the scope of the present disclosure, multiplexing and multiple access are not limited to the above schemes, and may be provided utilizing time division multiple access (TDMA), code division multiple access (CDMA), frequency division multiple access (FDMA), sparse code multiple access (SCMA), resource spread multiple access (RSMA), or other suitable multiple access schemes. Further, multiplexing DL transmissions from the base station 210 to UEs 222 and 224 may be provided utilizing time division multiplexing (TDM), code division multiplexing (CDM), frequency division multiplexing (FDM), orthogonal frequency division multiplexing (OFDM), sparse code multiplexing (SCM), or other suitable multiplexing schemes.

Various aspects of the present disclosure will be described with reference to an OFDM waveform, schematically illustrated in FIG. 3. It should be understood by those of ordinary skill in the art that the various aspects of the present disclosure may be applied to a DFT-s-OFDMA waveform in substantially the same way as described herein below. That is, while some examples of the present disclosure may focus on an OFDM link for clarity, it should be understood that the same principles may be applied as well to DFT-s-OFDMA waveforms.

As referred to within the present disclosure, a frame refers to a duration of 10 ms for wireless transmissions, with each frame consisting of 10 subframes of 1 ms each. On a given carrier, there may be one set of frames in the UL, and another set of frames in the DL. Referring now to FIG. 3, an expanded view of an exemplary DL subframe 302 is illustrated, showing an OFDM resource grid 304. However, as those skilled in the art will readily appreciate, the PHY transmission structure for any particular application may vary from the example described here, depending on any number of factors. Here, time is in the horizontal direction with units of OFDM symbols; and frequency is in the vertical direction with units of subcarriers or tones.

The resource grid 304 may be used to schematically represent time-frequency resources for a given antenna port. That is, in a MIMO implementation with multiple antenna ports available, a corresponding multiple number of resource grids 304 may be available for communication. The resource grid 304 is divided into multiple resource elements (REs) 306. An RE, which is 1 subcarrier×1 symbol, is the smallest discrete part of the time-frequency grid, and contains a single complex value representing data from a physical channel or signal. Depending on the modulation utilized in a particular implementation, each RE may represent one or more bits of information. In some examples, a block of REs may be referred to as a physical resource block (PRB) or more simply a resource block (RB) 308, which contains any suitable number of consecutive subcarriers in the frequency domain. In one example, an RB may include 12 subcarriers, a number independent of the numerology used. In some examples, depending on the numerology, an RB may include any suitable number of consecutive OFDM symbols in the time domain. Within the present disclosure, it is assumed that a single RB such as the RB 308 entirely corresponds to a single direction of communication (either transmission or reception for a given device).

A UE generally utilizes only a subset of the resource grid 304. An RB may be the smallest unit of resources that can be allocated to a UE. Thus, the more RBs scheduled for a UE, and the higher the modulation scheme chosen for the air interface, the higher the data rate for the UE. In this illustration, the RB 308 is shown as occupying less than the entire bandwidth of the subframe 302, with some subcarriers illustrated above and below the RB 308. In a given implementation, the subframe 302 may have a bandwidth corresponding to any number of one or more RBs 308. Further, in this illustration, the RB 308 is shown as occupying less than the entire duration of the subframe 302, although this is merely one possible example.

Each 1 ms subframe 302 may consist of one or multiple adjacent slots. In the example shown in FIG. 3, one subframe 302 includes four slots 310, as an illustrative example. In some examples, a slot may be defined according to a specified number of OFDM symbols with a given cyclic prefix (CP) length. For example, a slot may include 7 or 14 OFDM symbols with a nominal CP. Additional examples may include mini-slots having a shorter duration (e.g., one or two OFDM symbols). These mini-slots may in some cases be transmitted occupying resources scheduled for ongoing slot transmissions for the same or for different UEs.

An expanded view of one of the slots 310 illustrates the slot 310 including a control region 312 and a data region 314. In general, the control region 312 may carry control channels (e.g., the PDCCH), and the data region 314 may carry data channels (e.g., PDSCH or PUSCH). Of course, a slot may contain all DL, all UL, or at least one DL portion and at least one UL portion. The structure illustrated in FIG. 3 is merely exemplary in nature, and different slot structures may be utilized, and may include one or more of each of the control region(s) and data region(s).

Figure 3:
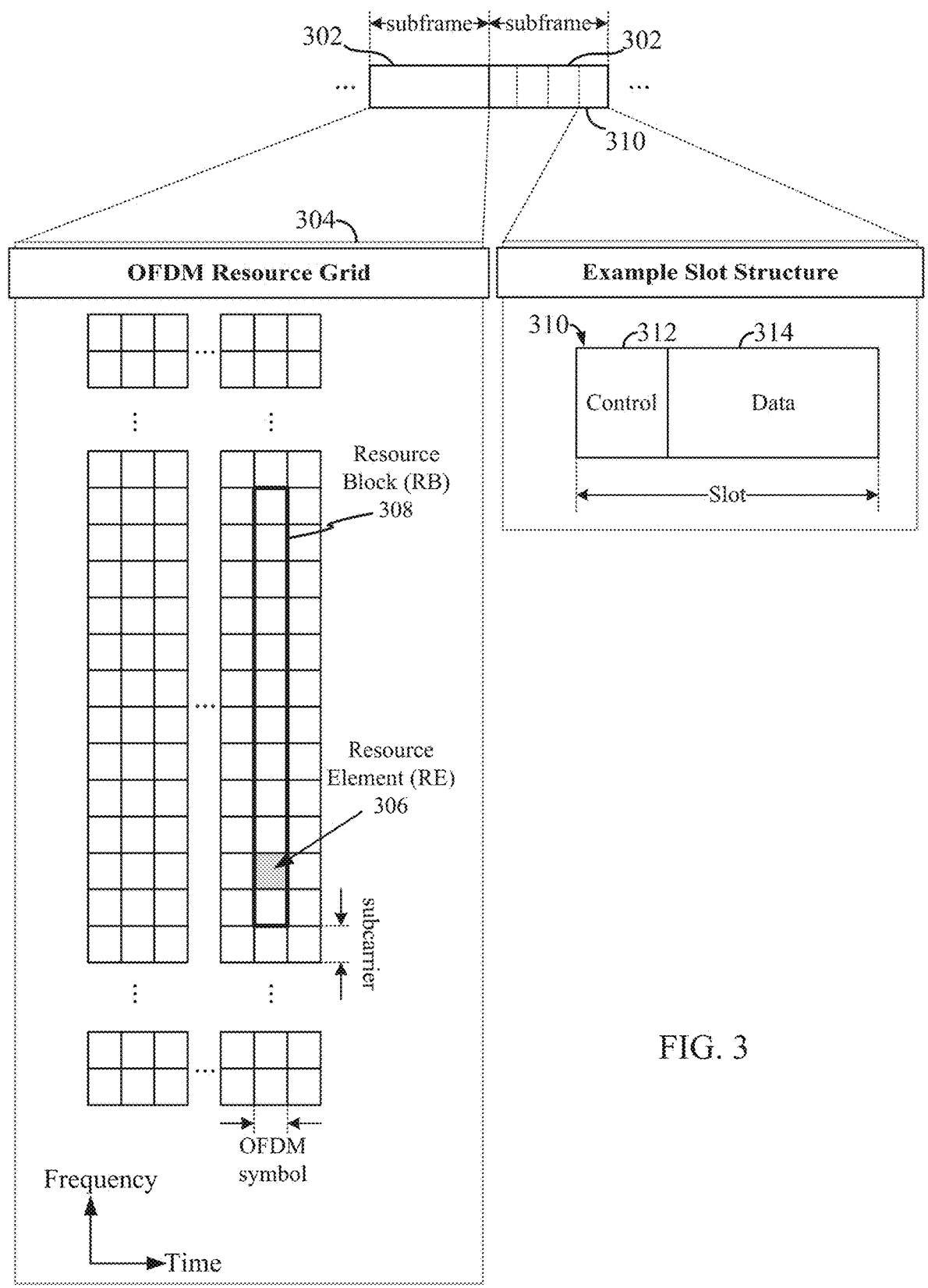
FIG. 3 illustrates an organization of wireless resources in an air interface utilizing orthogonal frequency divisional multiplexing (OFDM).

Although not illustrated in FIG. 3, the various REs 306 within a RB 308 may be scheduled to carry one or more physical channels, including control channels, shared channels, data channels, etc. Other REs 306 within the RB 308 may also carry pilots or reference signals, including but not limited to a demodulation reference signal (DMRS) a control reference signal (CRS), or a sounding reference signal (SRS). These pilots or reference signals may provide for a receiving device to perform channel estimation of the corresponding channel, which may enable coherent demodulation/detection of the control and/or data channels within the RB 308.

In a DL transmission, the transmitting device (e.g., the scheduling entity 108) may allocate one or more REs 306 (e.g., within a control region 312) to carry DL control information 114 including one or more DL control channels, such as a PBCH; a PSS; a SSS; a physical control format indicator channel (PCFICH); a physical hybrid automatic repeat request (HARQ) indicator channel (PHICH); and/or a physical downlink control channel (PDCCH), etc., to one or more scheduled entities 106. The PCFICH provides information to assist a receiving device in receiving and decoding the PDCCH. The PDCCH carries downlink control information (DCI) including but not limited to power control commands, scheduling information, a grant, and/or an assignment of REs for DL and UL transmissions. The PHICH carries HARQ feedback transmissions such as an acknowledgment (ACK) or negative-acknowledgment (NACK). HARQ is a technique well-known to those of ordinary skill in the art, wherein the integrity of packet transmissions may be checked at the receiving side for accuracy, e.g., utilizing any suitable integrity checking mechanism, such as a checksum or a cyclic redundancy check (CRC). If the integrity of the transmission confirmed, an ACK may be transmitted, whereas if not confirmed, a NACK may be transmitted. In response to a NACK, the transmitting device may send a HARQ retransmission, which may implement chase combining, incremental redundancy, etc.

In an UL transmission, the transmitting device (e.g., the scheduled entity 106) may utilize one or more REs 306 to carry UL control information 118 including one or more UL control channels, such as a physical uplink control channel (PUCCH), to the scheduling entity 108. UL control information may include a variety of packet types and categories, including pilots, reference signals, and information configured to enable or assist in decoding uplink data transmissions. In some examples, the control information 118 may include a scheduling request (SR), e.g., a request for the scheduling entity 108 to schedule uplink transmissions. Here, in response to the SR transmitted on the control channel 118, the scheduling entity 108 may transmit downlink control information 114 that may schedule resources for uplink packet transmissions. UL control information may also include HARQ feedback, channel state feedback (CSF), or any other suitable UL control information.

In addition to control information, one or more REs 306 (e.g., within the data region 314) may be allocated for user data or traffic data. Such traffic may be carried on one or more traffic channels, such as, for a DL transmission, a physical downlink shared channel (PDSCH); or for an UL transmission, a physical uplink shared channel (PUSCH). In some examples, one or more REs 306 within the data region 314 may be configured to carry system information blocks (SIBs), carrying information that may enable access to a given cell.

The channels or carriers described above and illustrated in FIGS. 1-3 are not necessarily all the channels or carriers that may be utilized between a scheduling entity 108 and scheduled entities 106, and those of ordinary skill in the art will recognize that other channels or carriers may be utilized in addition to those illustrated, such as other traffic, control, and feedback channels.

These physical channels described above are generally multiplexed and mapped to transport channels for handling at the medium access control (MAC) layer. Transport channels carry blocks of information called transport blocks (TB). The transport block size (TBS), which may correspond to a number of bits of information, may be a controlled parameter, based on the modulation and coding scheme (MCS) and the number of RBs in a given transmission.

Figure 4:
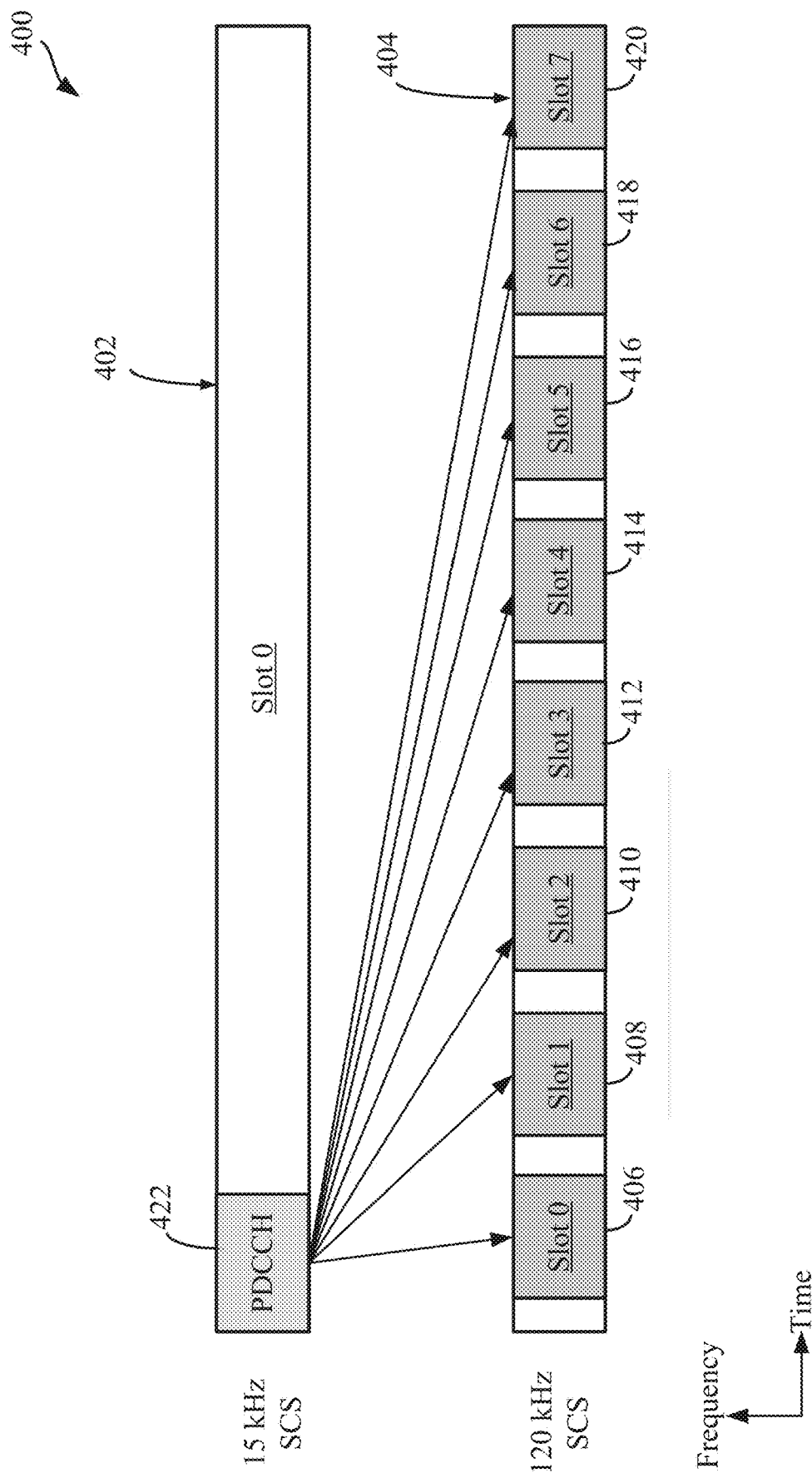
FIG. 4 illustrates an example of slot structures in a CA system using cross carrier scheduling with different SCS for the scheduling entities and scheduled entities.

Turning to specific examples of the present disclosure, FIG. 4 illustrates an example 400 of slot structures in a CA system using cross carrier scheduling with different SCSs for the respective scheduling entities and scheduled entities. In this example, a specified serving cell (e.g., a gNB, scheduling cell or scheduling entity, such as entity 108 in FIG. 1, or Primary Serving Cell (PSC)) schedules the resources for a number of other cells (i.e., scheduled cells or Secondary Serving Cells (SSCs)), which is typically up to 8 cells. In the illustrated example of FIG. 4, however, the scheduling cell is scheduling only one cell for simplicity of illustration.

Additionally, it is noted here that it is known that the SCS has an effect on the number of symbols, such as OFDM symbols, within a subframe. In particular, as SCS spacing gets wider or greater, the slot length will become shorter. In this example, it is assumed that the scheduling cell has an SCS of 15 kHz (i.e., spacing parameter µ=0 in known spacing numerology where the SCS or frequency spacing Δf is determined by the equation $\Delta f = 2^\mu \times 15$ kHz), which is typically the shortest used SCS spacing, and the scheduled cells utilize an SCS of 120 kHz (i.e., spacing parameter µ=3 in known spacing numerology) for purposes of this example, but those skilled in the art will appreciate the present disclosure is applicable to any of a number of SCS spacings. In known systems, the 15 kHz SCS would result in a one (1) millisecond (ms) slot, such as slot 402, which could also constitute an entire 1 ms subframe. The 120 kHz SCS would result in 8 slots having a duration of 1 ms/8 or 0.125 ms in the 1 ms subframe as shown at 404, with slot 0 through slot 7 (i.e., reference numbers 406, 408, 410, 412, 414, 416, 418, and 420, respectively). These slots 406-420 represent eight PDSCH transmissions in a scheduled cell that are scheduled by the PDCCH in the scheduling cell (i.e., slot 402 of the scheduling cell). For typical wireless systems currently in 5G NR, the scenario shown in FIG. 4 would constitute a worst case scenario where the scheduling cell has an SCS of 15 kHz, and the scheduled cell has an SCS of 120 kHz. Of further note, in this example the single slot 402 of the scheduling cell overlaps in time with the eight (8) slots (406-420) of the scheduled cell when 15 kHz SCS and 120 kHz SCSs are respectively used for the two cells, but other SCS values will result in other numerologies and overlaps, such as one scheduling cell slot overlapping four slots of a scheduled cell in an example of 15 kHz SCS in the scheduling cell and 60 kHz SCS (i.e., µ=2) in the scheduled cell.

For cross carrier scheduling, the scheduling cell includes the PDCCH 422 with downlink control indicators (DCIs) used by scheduled cells for DL reception and UL transmissions as well as other control information such as a slot format indicator, where the DCIs are decoded from the PDCCH 422 of the scheduling cell. The difference in the SCSs between the scheduling and scheduled cells imposes difficulties for UE decoding of the PDCCH 422. As may be seen in the figure, since the PDCCH 422 is typically at the beginning of the slot 0 402, there may be a significant delay and buffering that is experienced by a UE. Here, the DCIs for all slots of the scheduled cell are transmitted in the same PDCCH monitoring occasion, which results in a UE not being able to determine which DCI is designated for control information in which slot before the DCIs are decoded. For example, DCIs for the last slot of the scheduled cell (i.e., slot 7 (420) in FIG. 4) and DCIs for the first slot of the scheduled cell (slot 0 (406) in FIG. 4) are transmitted together in the same set of symbols in the scheduling cell. The UE may decode the DCI for the last slot before it decodes the DCI for the first slot. As a result, there may be a large timing delay for the UE to be able to decode a PDSCH transmitted in the first slot (i.e., slot 1 after slot 0). Accordingly, this arrangement presents timing problems, especially since a UE needs to finish the PDCCH decoding and DCI pruning and parsing quickly enough to then allow the UE to finish decoding the subsequent Physical Downlink Shared Channel PDSCH before the time UL transmission time for ACK/NACK report. These resultant timing problems may lead to unnecessary NACK reports and further delays.

Figure 5:
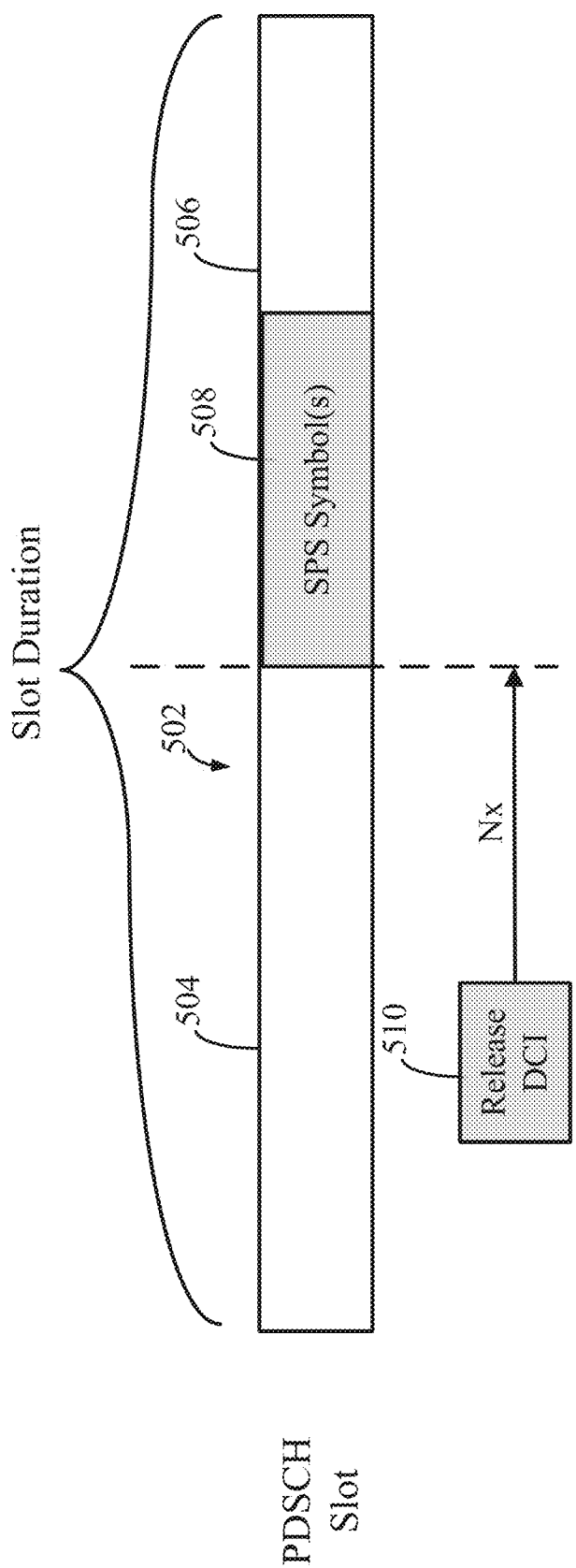
FIG. 5 illustrates a scheduling/transmission configuration of a wireless communication method according to some aspects of the present disclosure.

FIG. 5 illustrates the transmission of both a unicast PDSCH symbol and an SPS Release indicator within a single slot, which allows a limited capabilities UE to operate according to 3GPP Release 16. In particular, this approach allows releasing Semi-Persistent Scheduling (SPS) in a same slot that an UE receives the SPS PDSCH, e.g. for the case that SPS periodicity is down to 1 slot.

In one approach, a PDSCH slot 502 may include a first portion 504 followed by a second portion. The SPS PDSCH symbol (e.g., SPS Start Length Indicator Variable—SLIV) 508 may always be sent in the second portion 506 of the slot 502. The first portion 504 may be used to send a Release DCI (SPS Release) 510 when necessary. In this manner, when a UE receives the Release DCI 510, it knows to release SPS and may ignore the subsequent SPS symbol 508 within the same slot 502. In other cases, where nothing is received within the first portion 504, the UE may simply receive the SPS symbol 508 in the second portion 506. Note that the SPS symbol 508 occurs sufficiently early in the second portion 506 of the slot 502 to allow the UE to send an ACK/NACK to the sender (e.g., gNodeB).

According to another aspect, the Release DCI 510 may be transmitted within the slot 502 at least Nx symbols before the start of the SPS symbol 508 is expected to be received. Nx may be a number of symbols greater than or equal to zero (e.g., one symbol, two symbols, etc.). This allows the receiving UE sufficient time to send an ACK/NACK.

As shown in FIG. 5, the present disclosure provides mechanisms for permitting a UE to receive an SPS release within a slot having a scheduled downlink data communication. The scheduled downlink data communication can be a unicast PDSCH associated with a dynamic grant and/or an SPS grant. In some instances, the UE is a limited capability device that is configured to receive a single physical downlink shared channel (PDSCH) communication per slot. In this regard, the UE may be configured to only provide a single ACK/NACK per slot. As shown, the UE can monitor the PDCCH and PDSCH communications for the slot 502. For example, the UE can monitor a set of decoding candidates on PDCCH for relevant DCI communications, which may include the SPS release 510 and/or a dynamic grant. The UE can then send a feedback message (e.g., ACK/NACK) to the base station on PUCCH indicating whether a PDCCH communication was successfully detected and decoded or not.

When a limited capability UE detects the SPS release 510 in the slot 502, the UE does not expect to receive a PDSCH communication in the slot 502. In this regard, because the UE is a limited capability device and can only provide a single ACK/NACK for the slot 502, the base station should not send both the SPS release 510 and a downlink data communication in the slot 502. Accordingly, if the limited capability UE detects the SPS release 510 in the slot 502, then it will not expect to receive any downlink data communications in the slot 502. In some instances, the UE does not expect to receive a downlink communication (including an SPS PDSCH and/or a dynamic PDSCH) after the SPS release is received in the slot. In some instances, the UE does not expect to receive the SPS release after a predetermined number of symbols before the first symbol of the scheduled downlink data communication (e.g., an SPS PDSCH and/or a dynamic PDSCH).

As a result, the ACK/NACK provided by the UE for slot 502 will be based on the detection and successful decoding of the SPS release 510. The UE will send an ACK over PUCCH if the SPS release 510 is successfully decoded and will send a NACK if the SPS release is not detected and/or not successfully decoded. Since the slot 502 was scheduled for a downlink data communication, in the situation where the UE does not detect the SPS release 510 transmitted from the base station the UE will monitor for the scheduled downlink data communication in slot 502. However, as noted above, because of the limited capability of the UE the base station will not transmit the scheduled downlink data communication in the same slot as the SPS release 510. Accordingly, the UE will not detect or successfully decode the scheduled downlink data communication in slot 502. As a result, the UE will send a NACK over PUCCH to the base station. While the UE may send the NACK based on a failure to detect and successfully decode the scheduled downlink data communication, the base station is able to determine based on the NACK that the UE did not receive the transmitted SPS release 510. Accordingly, the base station can implement procedures for retransmitting the SPS release 510 in response to receiving the NACK from the UE.

In some instances, an ACK/NACK feedback timing for the SPS release 510 is aligned with an ACK/NACK feedback timing for the scheduled downlink data communication for the slot 502. For example, the SPS release may include downlink control information (DCI) which specifies the timing at which ACK/NACK feedback is to be sent (e.g., a specified number of symbols following receipt of the SPS release on PDCCH). The timing for sending the ACK/NACK for the SPS release 510 can be scheduled for the same slot (or sub-slot) of a PUCCH as the ACK/NACK for the scheduled downlink data communication (e.g., dynamic grant and/or an SPS grant). For example, the SPS PDSCH transmissions may be activated by SPS activation DCI and both the SPS activation DCI and the SPS release DCI may be configured such that respective acknowledgements are aligned. In other words, the ACK/NACK for the SPS release 510 and the HARQ ACK/NACK for the downlink data communication can be scheduled for the same slot (or sub-slot) on the same codebook. By aligning the ACK/NACK feedback timings, the base station can monitor for a single ACK/NACK response from the UE on PUCCH. As discussed above, the base station can determine whether the UE successfully received the SPS release 510 based on the single ACK/NACK regardless of whether the UE sends the ACK/NACK based on the SPS release 510 or based on the scheduled downlink data communication. In this regard, the UE will send an ACK when the SPS release 510 is detected and successfully decoded. The UE will send a NACK when the SPS release 510 is detected, but not successfully decoded. The UE can also send a NACK when the SPS release 510 is not detected. For example, when the SPS release 510 is not detected or is missed the UE can monitor for the scheduled downlink data communication. However, the base station will not transmit the scheduled downlink data communication and the SPS release 510 in the same slot. Accordingly, the UE will not detect or successfully decode the scheduled downlink data communication in the slot 502 and, therefore, will send an associated NACK. Since the ACK/NACK timing for the SPS release 510 and the ACK/NACK timing for the scheduled data communication are the same, the base station can determine from the single ACK/NACK received whether the UE successfully received the SPS release 510 or not.

Notably, this approach can be beneficial for non-limited capability UEs as well. These may include UEs that are capable of receiving more than one PDSCH in a same slot and/or which are not limited to a single ACK/NACK in relation to same-slot transmissions. For instance, where the scheduled downlink data communication for the slot 502 is a scheduled SPS downlink data communication and the SPS release 510 is configured to release the resources associated with the scheduled SPS downlink data communication, the UE does not expect to receive both the SPS release 510 and the scheduled SPS downlink data communication in the same slot. In some instances, the ACK/NACK feedback timing for the SPS release 510 is aligned with an ACK/NACK feedback timing for the scheduled SPS downlink data communication for the slot 502. For example, the timing for sending the ACK/NACK for the SPS release 510 received over PDCCH can be scheduled for the same slot (or sub-slot) of a PUCCH as the ACK/NACK for the scheduled SPS downlink data communication. By aligning the ACK/NACK feedback timings, the base station can monitor for a single ACK/NACK response from the non-limited capability UE on PUCCH. In a similar manner to the limited capability UE scenario, the base station can determine whether the non-limited capability UE successfully received the SPS release 510 based on the single ACK/NACK regardless of whether the UE sends the ACK/NACK based on the SPS release 510 or based on the scheduled SPS downlink data communication. In this regard, the non-limited capability UE will send an ACK when the SPS release 510 is detected and successfully decoded. The non-limited capability UE will send a NACK when the SPS release 510 is detected, but not successfully decoded. The non-limited capability UE can also send a NACK when the SPS release 510 is not detected. For example, when the SPS release 510 is not detected the non-limited capability UE can monitor for the scheduled SPS downlink data communication. However, the base station will not transmit the scheduled SPS downlink data communication and the SPS release 510 in the same slot. Accordingly, the non-limited capability UE will not detect or successfully decode the scheduled SPS downlink data communication in the slot 502 and, therefore, will send an associated NACK. Since the ACK/NACK timing for the SPS release 510 and the ACK/NACK timing for the scheduled SPS data communication are the same, the base station can determine from the single ACK/NACK received whether the non-limited capability UE successfully received the SPS release 510 or not.

In other words, for a non-limited capability UE, the UE does not expect to receive SPS PDSCH in a slot for a configuration index that is being released by SPS release PDCCH in the same slot, and K1 in the SPS release and the SPS activation indicate the same (sub)slot for sending ACK/NACK on PUCCH. For a non-limited capability UE, the UE doesn't expect PDSCH only for the same SPS PDSCH (not for any PDSCH in that slot), and when K1 in release and K1 in SPS PDSCH indicate the same (sub)slot. In some instances, the base station sets the K1 values such that the UE does not end up with out of order HARQ-ACK processing (e.g., a release PDCCH comes before a PDSCH but its HARQ-ACK is indicated to be send after the PDSCH's HARQ-ACK).

FIGS. 6-10 illustrate examples of how the mechanisms shown and described in the context of FIG. 5 can permit a UE to receive an SPS release within a slot having a scheduled downlink data communication.

Figure 6:
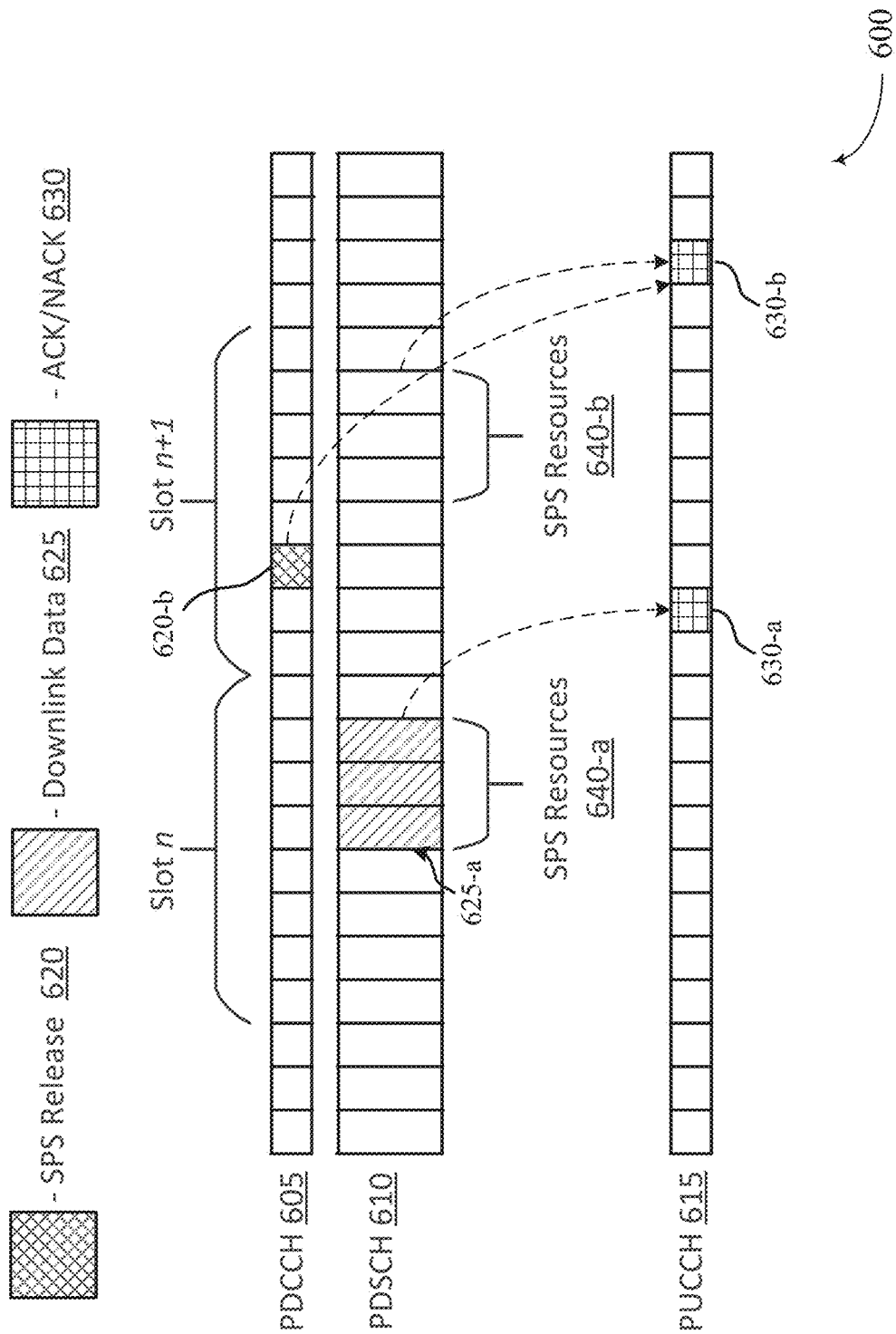
FIG. 6 illustrates a scheduling/transmission configuration of a wireless communication method according to some aspects of the present disclosure.

FIG. 6 illustrates a scheduling/transmission configuration 600 of a wireless communication method according to some aspects of the present disclosure. The scheduling/transmission configuration 600 shows a downlink control channel (PDCCH 605), a downlink data channel (PDSCH 610), and an uplink control channel (PUCCH 615). As shown and discussed further below, an SPS release 620, downlink data 625, and/or ACK/NACK 630 may be transmitted over the PDCCH 605, PDSCH 610, and/or the PUCCH 615. The scheduling/transmission configuration 600 shows two slots (Slot n and Slot n+1) having scheduled downlink data communications. In the illustrated example the slots (Slot n and Slot n+1) are each associated with a scheduled SPS downlink data communication as indicated by SPS resources 640-a (Slot n) and SPS resources 640-b (Slot n+1). The SPS resources 640-a and 640-b may be associated with the same SPS grant (e.g., an SPS grant having a periodicity of 1 slot as shown) or may be associated with different SPS grants (e.g., SPS resources 640-a are associated with a first SPS grant and SPS resources 640-b are associated with a second, different SPS grant).

In Slot n, downlink data 625-a associated with the scheduled SPS downlink data communication is transmitted by a base station to a UE over the PDSCH 610 using the SPS resources 640-a. The UE transmits an ACK/NACK 630-a over PUCCH 615 to indicate to the base station whether the downlink data 625-a was successfully decoded. The timing (e.g., K1 value, PUCCH scheduling, etc.) and/or codebook of the ACK/NACK 630-a can be provided in and/or based on the SPS grant associated with the downlink data 625-a.

In Slot n, an SPS release 620-b is transmitted by the base station to the UE over the PDCCH 605. The UE transmits an ACK/NACK 630-b to the base station over PUCCH 615. As shown, the timing of the ACK/NACK 630-b can be configured such that the ACK/NACK for the SPS release 620-b is aligned in the same slot (or sub-slot) of the PUCCH 615 as the ACK/NACK for the SPS resources 640-b. In this regard, the timing (e.g., K1 value, PUCCH scheduling, etc.) and/or codebook for the ACK/NACK for the SPS release 620-b can be provided as part of the SPS release 620-b. The timing (e.g., K1 value, PUCCH scheduling, etc.) and/or codebook for the ACK/NACK for the SPS resources 640-b can be provided in and/or based on the associated SPS grant. In some instances, the SPS release 620-b indicates to the UE to release the SPS resources 640-b associated with an SPS grant. In some instances, the SPS release 620-b indicates to the UE to release SPS resources other than SPS resources 640-b (e.g., SPS resources associated with a different SPS grant).

As discussed above, the scheduling/transmission configuration 600 of FIG. 6 is suitable for use for both limited capability UEs as well as non-limited capability UEs. In this regard, the base station can determine whether the UE (limited or non-limited) successfully received the SPS release 620-b based on the single ACK/NACK 630-b regardless of whether the UE sends the ACK/NACK based on the SPS release 620-b or based on the scheduled SPS downlink data communication. In this regard, the UE will send an ACK when the SPS release 620-b is detected and successfully decoded. The UE will send a NACK when the SPS release 620-b is detected, but not successfully decoded. The UE can also send a NACK when the SPS release 620-b is not detected. For example, when the SPS release 620-b is not detected or missed the UE can monitor for the scheduled SPS downlink data communication over the SPS resources 640-b of the PDSCH 610. However, the base station will not transmit the scheduled SPS downlink data communication over the PDSCH 610 and the SPS release 510 over the PDCCH 605 in the same slot (Slot n+1). Accordingly, the UE will not detect or successfully decode the scheduled SPS downlink data communication and, therefore, will send a NACK. Since the ACK/NACK timing for the SPS release 620-b and the ACK/NACK timing for the scheduled SPS data communication are the same on the PUCCH 615, the base station can determine from the single ACK/NACK received whether the UE (whether limited or non-limited) successfully received the SPS release 620-b or not.

Figure 7:
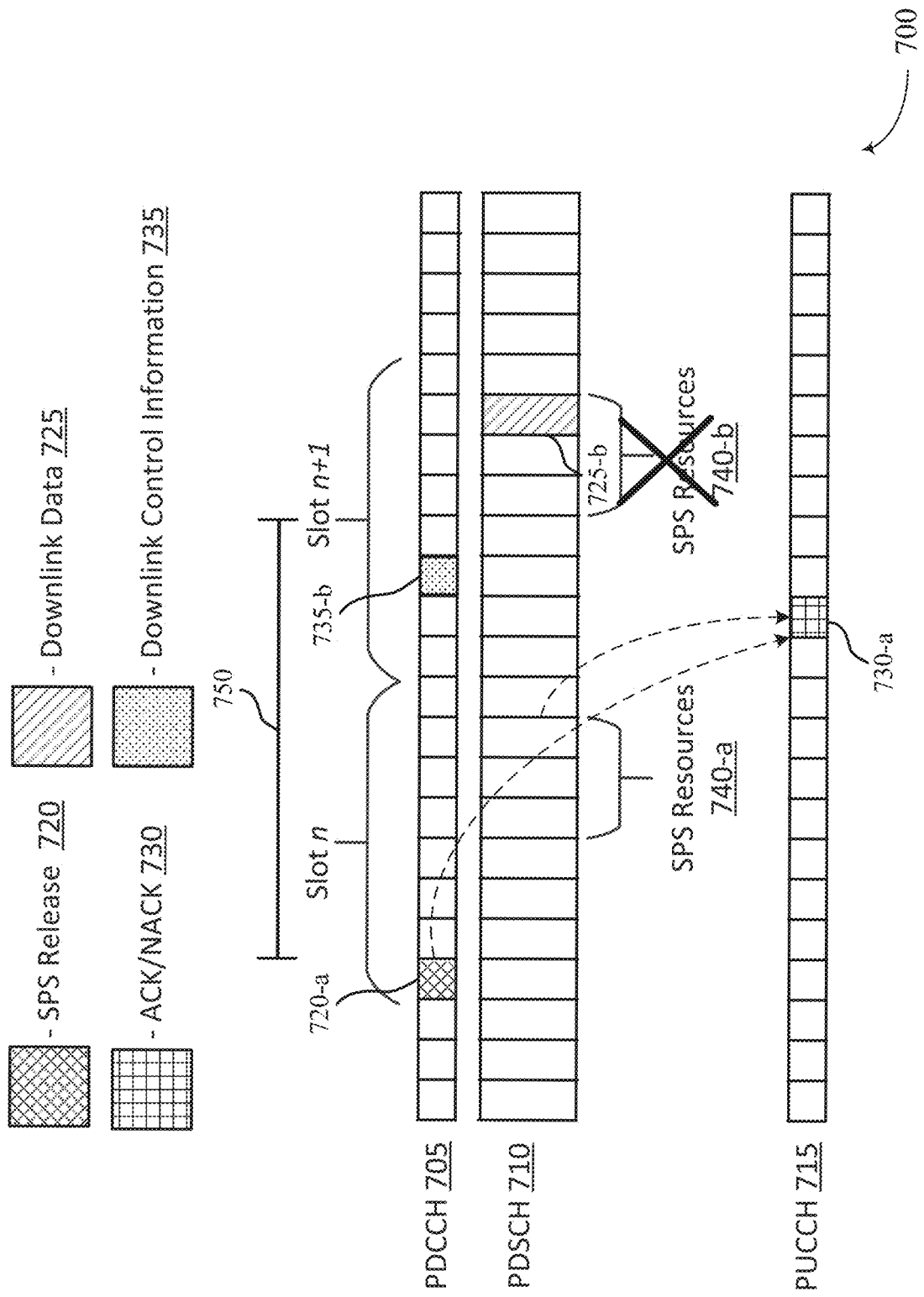
FIG. 7 illustrates a scheduling/transmission configuration of a wireless communication method according to some aspects of the present disclosure.

FIG. 7 illustrates a scheduling/transmission configuration 700 of a wireless communication method according to some aspects of the present disclosure. The scheduling/transmission configuration 700 shows a downlink control channel (PDCCH 705), a downlink data channel (PDSCH 710), and an uplink control channel (PUCCH 715). As shown and discussed further below, an SPS release 720, downlink data 725, ACK/NACK 730, and/or downlink control information 735 may be transmitted over the PDCCH 705, PDSCH 710, and/or the PUCCH 715. DCI 735, for example, may schedule a dynamic PDSCH transmission for the UE. The scheduling/transmission configuration 700 shows two slots (Slot n and Slot n+1) having scheduled downlink data communications. In the illustrated example, the slots (Slot n and Slot n+1) are each associated with a scheduled SPS downlink data communication as indicated by SPS resources 740-a (Slot n) and SPS resources 740-b (Slot n+1). The SPS resources 740-a and 740-b may be associated with the same SPS grant (e.g., an SPS grant having a periodicity of 1 slot as shown) or may be associated with different SPS grants (e.g., SPS resources 740-a are associated with a first SPS grant and SPS resources 740-b are associated with a second, different SPS grant).

In Slot n, an SPS release 720-a is transmitted by the base station to the UE over the PDCCH 705. The UE transmits an ACK/NACK 730-a to the base station over PUCCH 715. As shown, the timing of the ACK/NACK 730-a can be configured such that the ACK/NACK for the SPS release 720-a is aligned in the same slot (or sub-slot) of the PUCCH 715 as the ACK/NACK for the SPS resources 740-a. In this regard, the timing (e.g., K1 value, PUCCH scheduling, etc.) and/or codebook for the ACK/NACK for the SPS release 720-a can be provided as part of the SPS release 720-a. The timing (e.g., K1 value, PUCCH scheduling, etc.) and/or codebook for the ACK/NACK for the SPS resources 740-a can be provided in and/or based on the associated SPS grant. The SPS release 720-a can indicate to the UE to release the SPS resources 740-b scheduled for Slot n+1. In some instances, the SPS release 720-a indicates to the UE to release the SPS resources 740-b and SPS resources 740-a (e.g., where SPS resources 740-a and 740-b are associated with a common SPS grant having a periodicity of 1 slot). In some instances, the SPS release 720-a indicates to the UE to release SPS resources 740-b (or other SPS resources) associated with a different SPS grant than the SPS resources 740-a.

As shown, the SPS release 720-a is transmitted by the base station to the UE over the PDCCH 705 before the SPS resources 740-b are scheduled in Slot n+1. As a result, a time period 750 exists between the SPS release 720-a and the scheduled SPS resources 740-b of Slot n+1. In some instances, if the time period 750 satisfies a threshold, then other downlink data communication(s) can be scheduled and transmitted to the UE using or overlapping with one or more of the previously scheduled SPS resources 740-b that were released by the SPS release 720-a. On the other hand, if the time period 750 does not satisfy the threshold, then no downlink data communication(s) should be scheduled or transmitted to the UE using the scheduled SPS resources 740-b being released by the SPS release 720-a. In some instances, the threshold for the time period 750 is a number of symbols (e.g., 5, 7, 8, 10, 12, 14, 16, 20, 24, 28, 32, or any other suitable number), a length of time (e.g., 66 μs, 83 μs, 233 μs, 250 μs, 500 μs, or any other suitable time), and/or combinations thereof. In some instances, the threshold for the time period 750 is determined based on a capability of the UE (e.g., available processing resources, a processing time for PDCCH, a processing time for PDSCH, etc.). The UE may communicate its capabilities (e.g., single or multiple PDSCH per slot, processing parameters, etc.) to the base station in a capability report. The base station may utilize the UE's capabilities for scheduling communications with the UE in accordance with the present disclosure.

In the example of FIG. 7, the time period 750 satisfies the threshold required to allow other downlink data communication(s) to be scheduled and transmitted to the UE using the previously scheduled SPS resources 740-b. Accordingly, in Slot n+1 a downlink control information 735-b transmitted over the PDCCH 705 schedules downlink data 725-b using one or more of the SPS resources 740-b. The SPS resources 740-b were released as a result of the SPS release 720-a as indicated by the "X" through the SPS resources 740-b. While FIG. 7 shows an example where the SPS release 720-a is transmitted in a different slot than the SPS resources 740-b being released, in other instances the SPS release is transmitted in the same slot as the SPS resources being released and the time period 750 is evaluated in a similar manner to determine whether other downlink data communications can be transmitted using the previously scheduled SPS resources.

Figure 8:
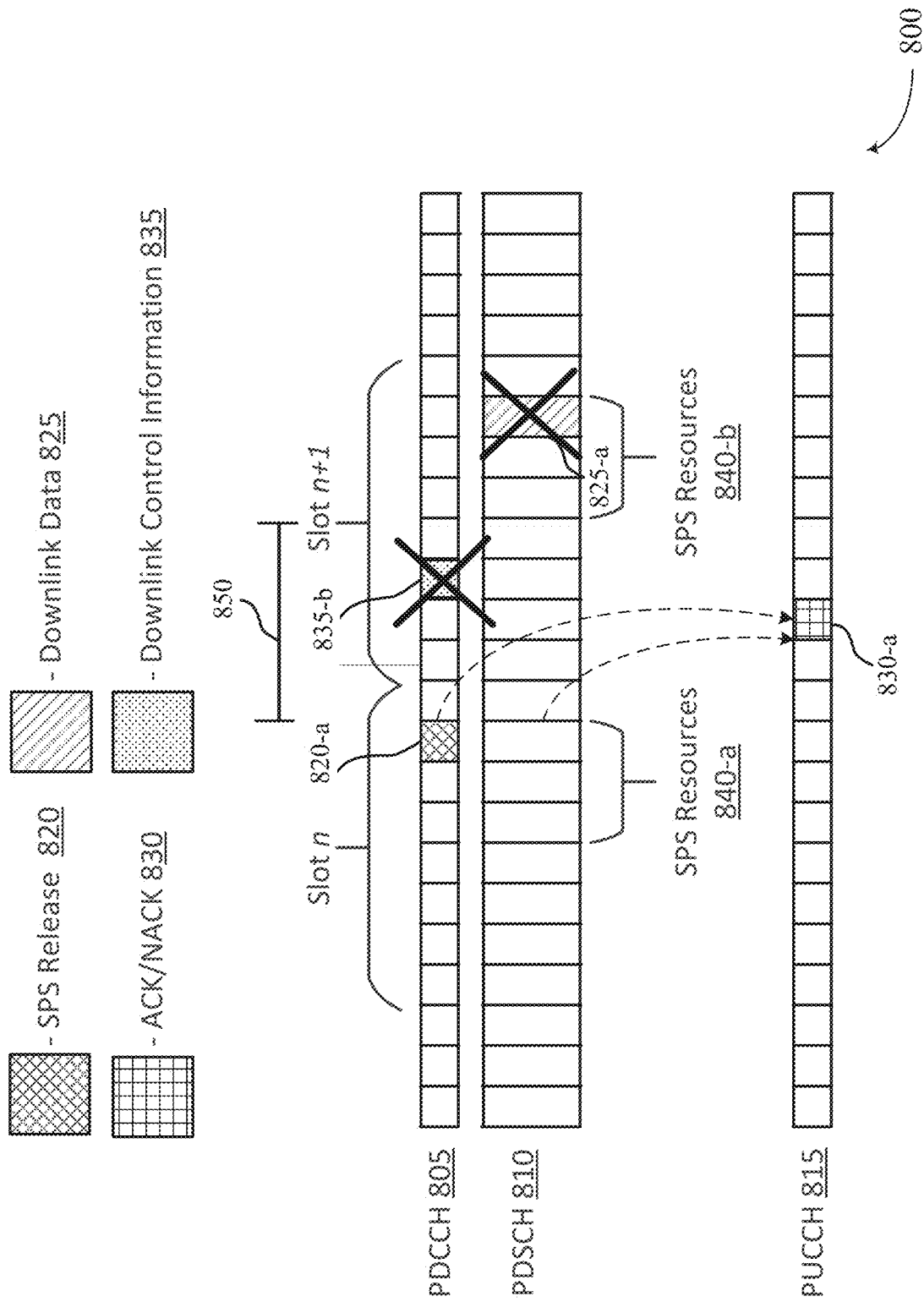
FIG. 8 illustrates a scheduling/transmission configuration of a wireless communication method according to some aspects of the present disclosure.

FIG. 8 illustrates a scheduling/transmission configuration 800 of a wireless communication method according to some aspects of the present disclosure. The scheduling/transmission configuration 800 is similar in some respects to scheduling/transmission configuration 700 discussed above, but scheduling/transmission configuration 800 shows an example where the time period between an SPS release and the scheduled SPS resources does not satisfy the threshold necessary to allow other downlink data communication(s) to be scheduled and transmitted to the UE using or overlapping with the previously scheduled SPS resources.

The scheduling/transmission configuration 800 shows a downlink control channel (PDCCH 805), a downlink data channel (PDSCH 810), and an uplink control channel (PUCCH 815). As shown and discussed further below, an SPS release 820, downlink data 825, ACK/NACK 830, and/or downlink control information 835 (e.g., DCI scheduling a dynamic PDSCH transmission for the UE) may be transmitted over the PDCCH 805, PDSCH 810, and/or the PUCCH 815. The scheduling/transmission configuration 800 shows two slots (Slot n and Slot n+1) having scheduled downlink data communications. In the illustrated example, the slots (Slot n and Slot n+1) are each associated with a scheduled SPS downlink data communication as indicated by SPS resources 840-a (Slot n) and SPS resources 840-b (Slot n+1). The SPS resources 840-a and 840-b may be associated with the same SPS grant (e.g., an SPS grant having a periodicity of 1 slot as shown) or may be associated with different SPS grants (e.g., SPS resources 840-a are associated with a first SPS grant and SPS resources 840-b are associated with a second, different SPS grant).

In Slot n, an SPS release 820-a is transmitted by the base station to the UE over the PDCCH 805. The UE transmits an ACK/NACK 830-a to the base station over PUCCH 815. As shown, the timing of the ACK/NACK 830-a can be configured such that the ACK/NACK for the SPS release 820-a is aligned in the same slot (or sub-slot) of the PUCCH 815 as the ACK/NACK for the SPS resources 840-a. In this regard, the timing (e.g., K1 value, PUCCH scheduling, etc.) and/or codebook for the ACK/NACK for the SPS release 820-a can be provided as part of the SPS release 820-a. The timing (e.g., K1 value, PUCCH scheduling, etc.) and/or codebook for the ACK/NACK for the SPS resources 840-a can be provided in and/or based on the associated SPS grant. The SPS release 820-a can indicate to the UE to release the SPS resources 840-*b* scheduled for Slot n+1. In some instances, the SPS release 820-*a* indicates to the UE to release the SPS resources 840-*b* and SPS resources 840-*a* (e.g., where SPS resources 840-*a* and 840-*b* are associated with a common SPS grant having a periodicity of 1 slot). In some instances, the SPS release 820-*a* indicates to the UE to release SPS resources 840-*b* (or other SPS resources) associated with a different SPS grant than the SPS resources 840-*a*.

As shown, the SPS release 820-*a* is transmitted by the base station to the UE over the PDCCH 805 before the SPS resources 840-*b* are scheduled in Slot n+1. As a result, a time period 850 exists between the SPS release 820-*a* and the scheduled SPS resources 840-*b* of Slot n+1. In some instances, if the time period 850 satisfies a threshold, then other downlink data communication(s) can be scheduled and transmitted to the UE using the previously scheduled SPS resources 840-*b* that were released by the SPS release 820-*a*. On the other hand, if the time period 850 does not satisfy the threshold, then no downlink data communication(s) should be scheduled or transmitted to the UE using the scheduled SPS resources 840-*b* being released by the SPS release 820-*a*. In some instances, the threshold for the time period 850 is a number of symbols (e.g., 5, 7, 8, 10, 12, 14, 16, 20, 24, 28, 32, or any other suitable number), a length of time (e.g., 66 μs, 83 μs, 233 μs, 250 μs, 500 μs, or any other suitable time), and/or combinations thereof. In some instances, the threshold for the time period 850 is determined based on a capability of the UE (e.g., available processing resources, a processing time for PDCCH, a processing time for PDSCH, etc.). The UE may communicate its capabilities (e.g., single or multiple PDSCH per slot, processing parameters, etc.) to the base station in a capability report. The base station may utilize the UE's capabilities for scheduling communications with the UE in accordance with the present disclosure.

In the example of FIG. 8, the time period 850 does not satisfy the threshold required to allow other downlink data communication(s) to be scheduled and transmitted to the UE using the previously scheduled SPS resources 840-*b*. Accordingly, in Slot n+1 a downlink control information 835-*b* transmitted over the PDCCH 805 and/or associated downlink data 825-*b* using one or more of the SPS resources 840-*b* are not transmitted as indicated by the "X" through each. While FIG. 8 shows an example where the SPS release 820-*a* is transmitted in a different slot than the SPS resources 840-*b* being released, in other instances the SPS release is transmitted in the same slot as the SPS resources being released and the time period 850 is evaluated in a similar manner to determine whether other downlink data communications can be transmitted using the previously scheduled SPS resources.

Figure 9:
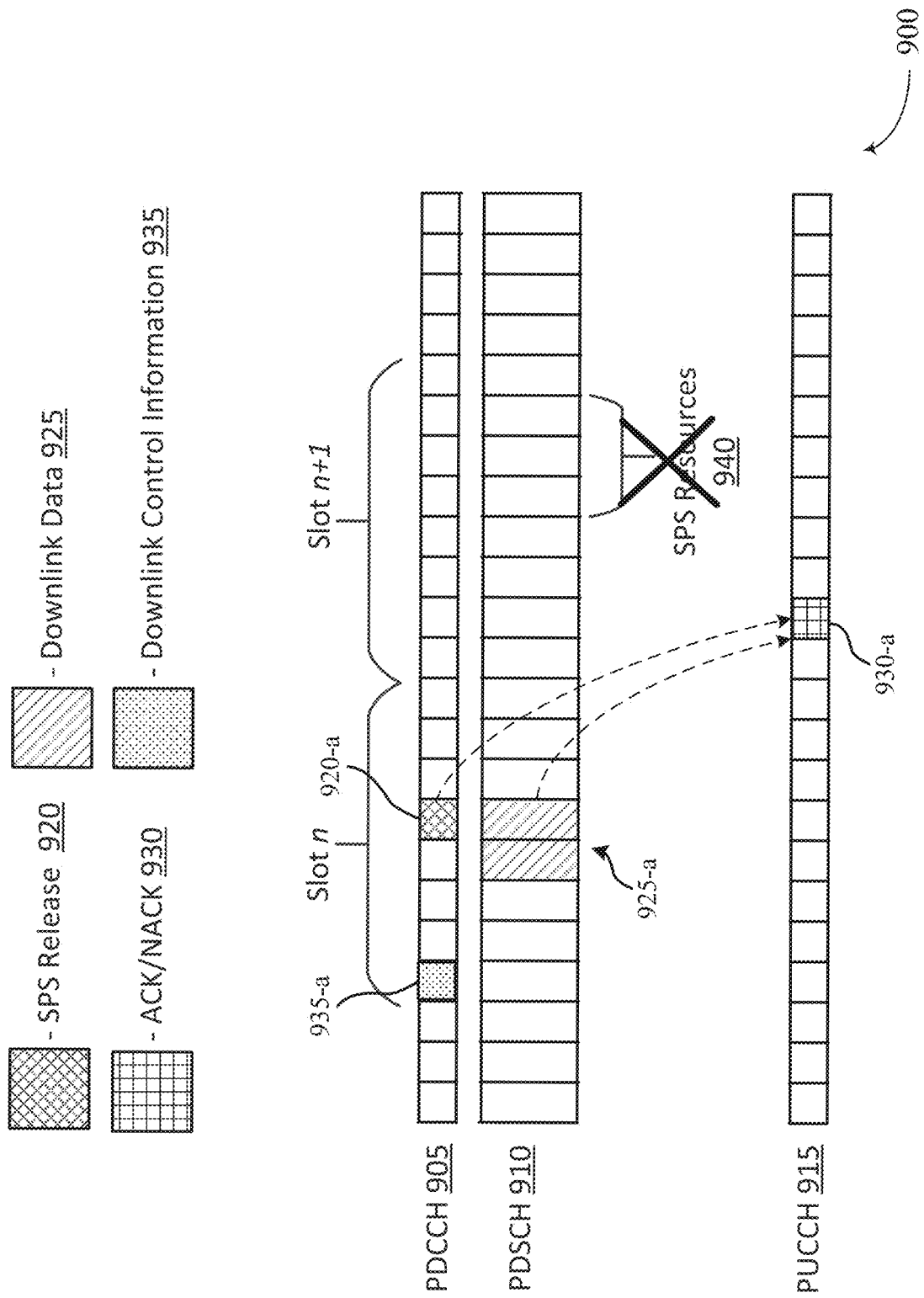
FIG. 9 illustrates a scheduling/transmission configuration of a wireless communication method according to some aspects of the present disclosure.

FIG. 9 illustrates a scheduling/transmission configuration 900 of a wireless communication method according to some aspects of the present disclosure. The scheduling/transmission configuration 900 shows a downlink control channel (PDCCH 905), a downlink data channel (PDSCH 910), and an uplink control channel (PUCCH 915). As shown and discussed further below, an SPS release 920, downlink data 925, ACK/NACK 930, and/or downlink control information 935 may be transmitted over the PDCCH 905, PDSCH 910, and/or the PUCCH 915. The scheduling/transmission configuration 900 shows two slots (Slot n and Slot n+1) having scheduled downlink data communications. In the illustrated example Slot n is associated with the communication of downlink data 925-*a*. In some instances, the downlink data 925-*a* is associated with a dynamic grant. For example, the downlink data 925-*a* may be associated with downlink control information 935-*a* transmitted over the PDCCH 905. Slot n+1 is associated with a scheduled SPS downlink data communication as indicated by SPS resources 940.

In Slot n, an SPS release 920-*a* is transmitted by the base station to the UE over the PDCCH 905. In this regard, in some instances the SPS release 920-*a* can override the scheduled downlink data 925-*a*. For example, where the SPS grant is associated with an ultra-reliable low-latency communications (URLLCs) service type and/or other communication(s) having a higher priority than, for example, downlink data 925-*a* for an enhanced mobile broadband (eMBB) service type, acknowledging the URLLC SPS release 920-*a* can be prioritized over acknowledging the eMBB downlink data 925-*a*. In this regard, the UE can transmit an ACK/NACK 930-*a* for the SPS release 920-*a* to the base station over PUCCH 715. As shown, the timing of the ACK/NACK 930-*a* can be configured such that the ACK/NACK for the SPS release 920-*a* is aligned in the same slot (or sub-slot) of the PUCCH 915 as the ACK/NACK for the downlink data 925-*a*. The SPS release 920-*a* can indicate to the UE to release the SPS resources 940 scheduled for Slot n+1 or other SPS resources.

In some instances, the base station prioritizes the SPS release 920-*a* over the downlink data 925-*a* and, therefore, does not transmit the downlink data 925-*a*. In this situation, the ACK/NACK 930-*a* of the scheduling/transmission configuration 900 can function in the same manner as the ACK/NACKs of the scheduling/transmission configurations 600, 700, and 800, as discussed above, to indicate to the base station whether the UE successfully detected and decoded the SPS release. In some instances, the base station transmits both the SPS release 920-*a* and the downlink data 925-*a* during the Slot n. In this situation, if the UE detects the SPS release 920-*a*, then the UE can send the ACK/NACK 930-*a* based on whether the SPS release 920-*a* is successfully decoded. In some instances where both the SPS release 920-*a* and the downlink data 925-*a* are transmitted in the same slot, the base station can interpret the ACK/NACK 930-*a* in relation to the SPS release 920-*a* and not the downlink data 925-*a*. For example, where ACK/NACK feedback for the URLLC SPS release and the eMBB data transmission would collide in a slot, the UE may apply priority rules and determine to send ACK/NACK for the SPS release when URLLC traffic is associated with a higher priority. In some instances, the UE can be configured to provide multiple ACK/NACKs per slot. Accordingly, in such instances the UE may send an ACK/NACK for each of the SPS release 920-*a* and the downlink data 925-*a*, so as long as the scheduled PUCCH resources for each ACK/NACK are different. In some instances, the base station can set the timing of the ACK/NACKs for the SPS release 920-*a* and the downlink data 925-*a* such that the ACK/NACKs are not aligned in the same slot (or sub-slot) of the PUCCH.

Figure 10A:
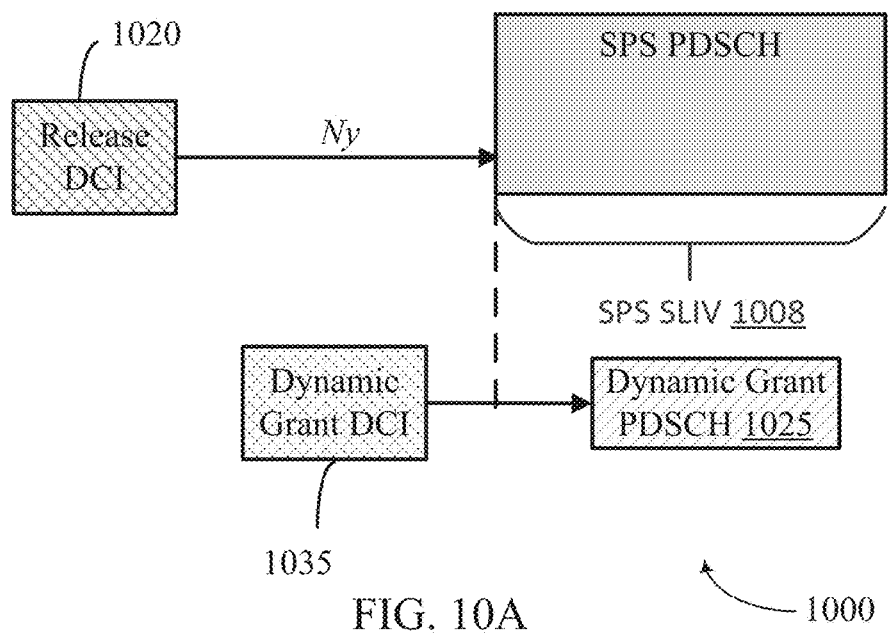
FIG. 10A illustrates a scheduling/transmission configuration of a wireless communication method according to some aspects of the present disclosure.

FIG. 10A illustrates a scheduling/transmission configuration 1000 of a wireless communication method according to some aspects of the present disclosure. As shown, an SPS release 1020 is transmitted by the base station to the UE a time period ($N_y$) prior to a scheduled SPS PDSCH 1008. In some instances, if the time period ($N_y$) satisfies a threshold, then other downlink data communication(s) can be scheduled and transmitted to the UE using or overlapping with the previously scheduled SPS PDSCH resources 1008. For example, a dynamic grant DCI 1035 may schedule a dynamic grant PDSCH 1025 for one or more resources overlapping in time and/or frequency with resources previously scheduled for the SPS PDSCH 1008. On the other hand, if the time period ($N_y$) does not satisfy the threshold, then no downlink data communication(s) should be scheduled or transmitted to the UE using the scheduled SPS PDSCH resources 1008. For example, the base station can refrain from transmitting the dynamic grant PDSCH 1025 (if the dynamic grant DCI 1035 has already been transmitted) and/or refrain from transmitting the dynamic grant DCI 1035.

In some instances, the threshold for the time period ($N_y$) is a number of symbols (e.g., 5, 7, 8, 10, 12, 14, 16, 20, 24, 28, 32, or any other suitable number), a length of time (e.g., 66 μs, 83 μs, 233 μs, 250 μs, 500 μs, or any other suitable time), and/or combinations thereof. In some instances, the threshold for the time period ($N_y$) is determined based on a capability of the UE (e.g., available processing resources, a processing time for PDCCH, a processing time for PDSCH, etc.). In some instances, $N_y = T_{proc,1}$, where $T_{proc,1}$ is a PDSCH processing time for the UE. In some instances, the UE includes an indication of the PDSCH processing time in a capability report transmitted to the base station. In this regard, the capability report may also indicate that the UE is configured to receive one or multiple PDSCH communications per slot.

Figure 10B:
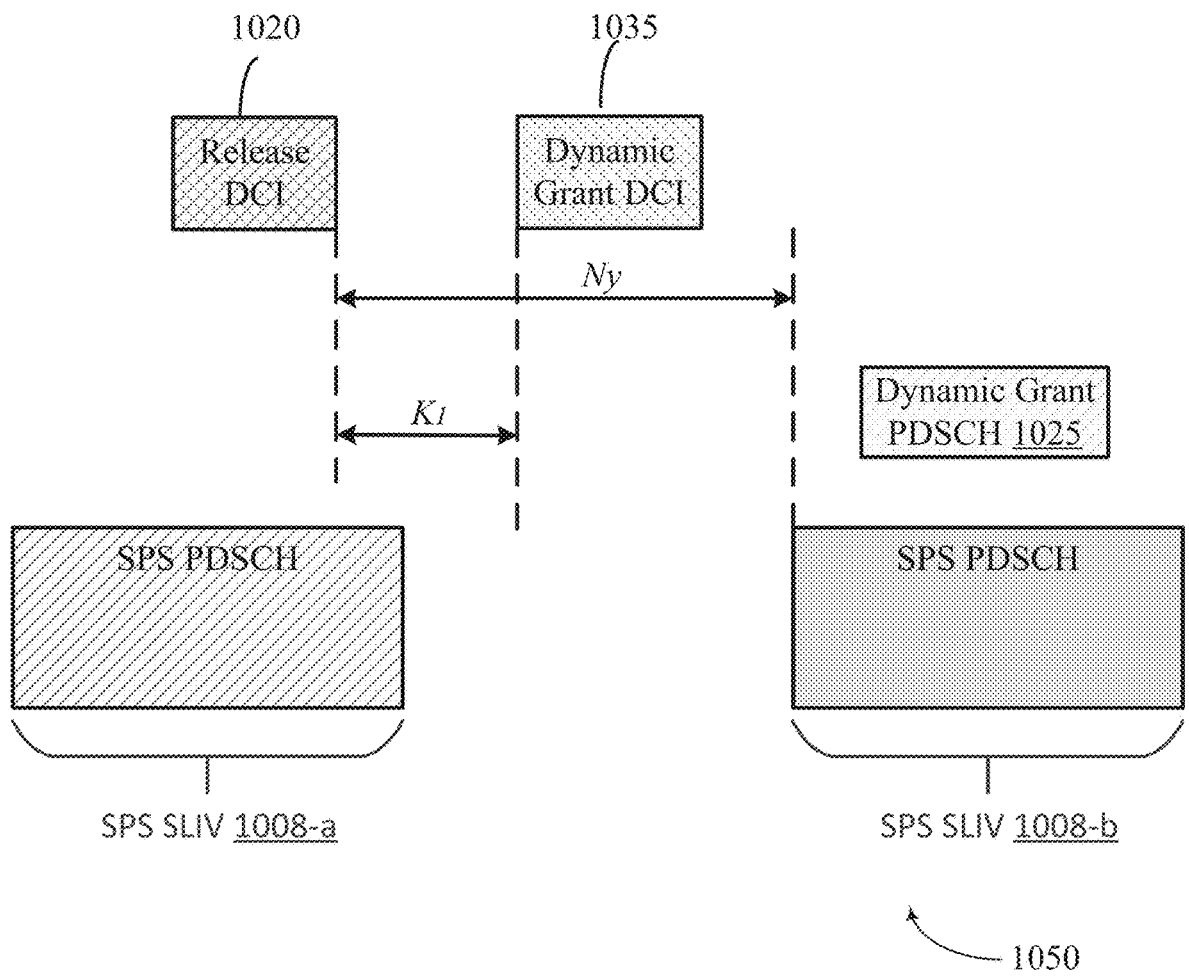
FIG. 10B illustrates a scheduling/transmission configuration of a wireless communication method according to some aspects of the present disclosure.

FIG. 10B illustrates a scheduling/transmission configuration 1050 of a wireless communication method according to some aspects of the present disclosure. As shown, an SPS release 1020 is transmitted by the base station to the UE. SPS release 1020 may comprise release DCI and may be transmitted to the UE on a PDCCH. In some instances, the SPS release 1020 (e.g., resources on which the release DCI message or the PDCCH are transmitted by the base station) partially or entirely overlap in time with a scheduled SPS PDSCH 1008-a. In other instances, the SPS release 1020 is received before or after the scheduled SPS PDSCH 1008-a. As shown, SPS release 1020 is received a time period ($N_y$) prior to a scheduled SPS PDSCH 1008-b. In some instances, the time period ($N_y$) can be between a dynamic grant DCI 1035 (instead of the SPS release 1020) and the scheduled SPS PDSCH 1008-b.

In some instances, if the time period ($N_y$) satisfies a threshold, then other downlink data communication(s) can be scheduled and transmitted to the UE using or overlapping with resources of the scheduled SPS PDSCH 1008-b. For example, a dynamic grant DCI 1035 may schedule a dynamic grant PDSCH 1025 for one or more resources overlapping in time and/or frequency with resources previously scheduled for the SPS PDSCH 1008-b. In some instances, the threshold for the time period ($N_y$) is a number of symbols (e.g., 5, 7, 8, 10, 12, 14, 16, 20, 24, 28, 32, or any other suitable number), a length of time (e.g., 66 μs, 83 μs, 233 μs, 250 μs, 500 μs, or any other suitable time), and/or combinations thereof. In some instances, the threshold for the time period ($N_y$) is determined based on a capability of the UE (e.g., available processing resources, a processing time for PDCCH, a processing time for PDSCH, etc.). In some instances, $N_y = T_{proc,1}$, where $T_{proc,1}$ is a PDSCH processing time for the UE. In some instances, the UE includes an indication of the PDSCH processing time in a capability report transmitted to the base station. In this regard, the capability report may also indicate that the UE is configured to receive one or multiple PDSCH communications per slot.

As also shown, the scheduling/transmission configuration 1050 includes the dynamic grant DCI 1035 transmitted by the base station to the UE. In some instances, the dynamic grant DCI 1035 may schedule a dynamic grant PDSCH 1025 that overlaps with one or more of the resources of the scheduled SPS PDSCH 1008-b. The dynamic grant DCI 1035 is transmitted at least a time period (Kr) associated with sending ACK/NACK for the release DCI 1020, an ACK/NACK for the SPS PDSCH 1008-a, and/or the end of the scheduled SPS PDSCH 1008-a. In some instances, a timing of ACK/NACK for the release DCI 1020 and the ACK/NACK for the SPS PDSCH 1008-a are aligned in accordance with the present disclosure (see, e.g., FIGS. 6-9). In some instances, the UE does not expect to receive a dynamic grant PDCCH communication (e.g., dynamic grant DCI 1035) from the BS unless the time period ($K_1$) satisfies a threshold. In some instances, the threshold for the time period ($K_1$) is a number of symbols (e.g., 1, 2, 3, 4, 5, 7, 8, 10, 12, 14, 16, 20, 24, 28, 32, or any other suitable number), a length of time (e.g., 44 μs, 66 μs, 83 μs, 233 μs, 250 μs, 500 μs, or any other suitable time), and/or combinations thereof. In some instances, the threshold for the time period ($K_1$) is determined based on a capability of the UE (e.g., available processing resources, a processing time for PDCCH, a processing time for PDSCH, etc.). In some instances, the threshold for the time period ($K_1$) is based on a capability of the UE plus a buffer (e.g., $K_1 \geq N_1 + d$, where $N_1$ is associated with the capability of the UE and d is the buffer, with $d \geq 0$ in some instances). In some instances, the UE includes an indication of a capability or associated timing (e.g., $N_1$) in a capability report transmitted to the base station.

In some instances, if (1) the time period ($N_y$) between the SPS release 1020 (or the dynamic grant DCI 1035) and the scheduled SPS PDSCH 1008-b satisfies a corresponding threshold and (2) the time period ($K_1$) between the dynamic grant DCI 1035 and the ACK/NACK for the release DCI 1020, the ACK/NACK for the SPS PDSCH 1008-a, and/or the end of the scheduled SPS PDSCH 1008-a satisfies a corresponding threshold, then other downlink data communication(s) (e.g., dynamic grant PDSCH 1025) can be scheduled and transmitted to the UE using or overlapping with the resources of the scheduled SPS PDSCH 1008-b. In this regard, in some instances the BS waits for receipt of an ACK for the release DCI 1020 from the UE before transmitting the dynamic grant DCI 1035. Accordingly, when the BS receives an ACK from the UE for the release DCI 1020, the BS can transmit the dynamic grant DCI 1035 indicating that the dynamic grant PDSCH 1025 will be transmitted to the UE using one or more resources overlapping with the now released SPS PDSCH 1008-b. On the other hand, if the UE does not receive and/or properly decode the release DCI 1020, then the UE can transmit a NACK (or not transmit an ACK) for the SPS PDSCH 1008-a to the BS. In turn, the BS can determine that the UE did not successfully receive the release DCI and refrain from scheduling a dynamic grant for the UE during the scheduled SPS PDSCH 1008-b, refrain from transmitting the dynamic grant DCI 1035 to the UE, and/or refrain from transmitting the dynamic grant PDSCH 1025 to the UE.

Further, if the time period ($N_y$) and/or the time period ($K_1$) does not satisfy the corresponding threshold, then no downlink data communication(s) should be scheduled or transmitted to the UE which overlap with the scheduled SPS PDSCH resources 1008-b. In this regard, when the threshold for the time period ($N_y$) and/or the time period ($K_1$) is not satisfied the BS can refrain from transmitting the dynamic grant DCI 1035 and/or refrain from transmitting the dynamic grant PDSCH 1025 (e.g., if the dynamic grant DCI 1035 has already been transmitted). Also, when the threshold for the time period ($N_y$) and/or the time period ($K_1$) is not satisfied the UE does not expect to receive dynamic grant PDSCH 1025 and can treat the dynamic grant DCI 1035 as an error. For example, the UE may discard or ignore the information in the dynamic grant DCI 1035. In this regard, the UE may not decode and/or attempt to decode the dynamic grant PDSCH 1025 and/or transmit a NACK associated with the scheduled SPS PDSCH 1008-$b$. In this regard, the NACK associated with the scheduled SPS PDSCH 1008-$b$ can indicate to the BS that the UE did not successfully receive and/or decode the dynamic grant DCI 1035 and/or the dynamic grant PDSCH 1025.

Figure 11:
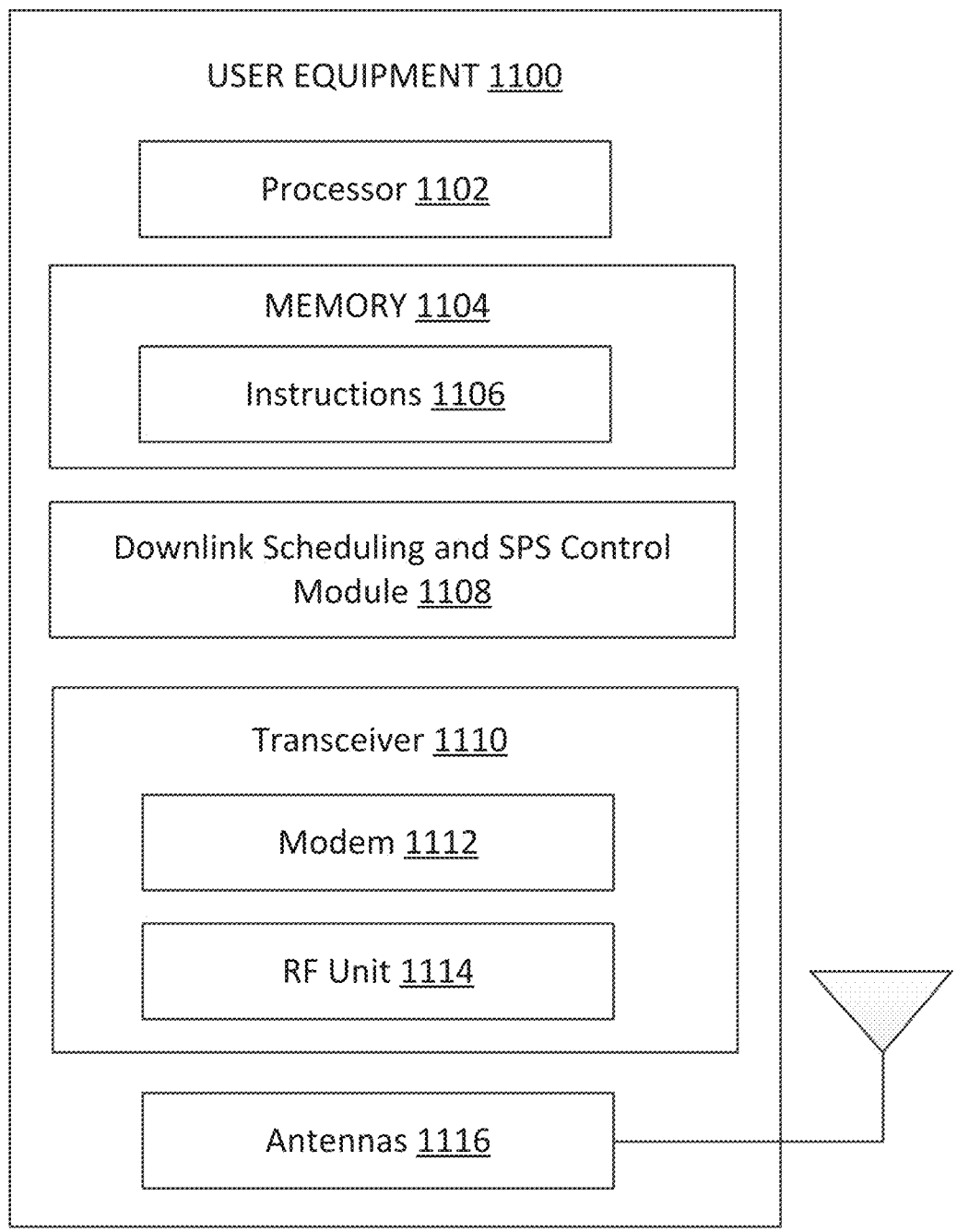
FIG. 11 is a block diagram of a user equipment (UE) according to some aspects of the present disclosure.

FIG. 11 is a block diagram of an exemplary UE 1100 according to aspects of the present disclosure. The UE 1100 may be a UE 106 as discussed above in FIG. 1. As shown, the UE 1100 may include a processor 1102, a memory 1104, a downlink scheduling and SPS control module 1108, a transceiver 1110 including a modem subsystem 1112 and a radio frequency (RF) unit 1114, and one or more antennas 1116. These elements may be in direct or indirect communication with each other, for example via one or more buses.

The processor 1102 may include a central processing unit (CPU), a digital signal processor (DSP), an application specific integrated circuit (ASIC), a controller, a field programmable gate array (FPGA) device, another hardware device, a firmware device, or any combination thereof configured to perform the operations described herein. The processor 1102 may also be implemented as a combination of computing devices, e.g., a combination of a DSP and a microprocessor, a plurality of microprocessors, one or more microprocessors in conjunction with a DSP core, or any other such configuration.

The memory 1104 may include a cache memory (e.g., a cache memory of the processor 1102), random access memory (RAM), magnetoresistive RAM (MRAM), read-only memory (ROM), programmable read-only memory (PROM), erasable programmable read only memory (EPROM), electrically erasable programmable read only memory (EEPROM), flash memory, solid state memory device, hard disk drives, other forms of volatile and non-volatile memory, or a combination of different types of memory. In an example, the memory 1104 includes a non-transitory computer-readable medium. The memory 1104 may store, or have recorded thereon, instructions 1106. The instructions 1106 may include instructions that, when executed by the processor 1102, cause the processor 1102 to perform the operations described herein with reference to the UEs 106 in connection with aspects of the present disclosure, for example, aspects of FIGS. 5-10B, 13, and 15. Instructions 1106 may also be referred to as program code. The program code may be for causing a wireless communication device (or specific component(s) of the wireless communication device) to perform these operations, for example by causing one or more processors (such as processor 1102) to control or command the wireless communication device (or specific component(s) of the wireless communication device) to do so. The terms "instructions" and "code" should be interpreted broadly to include any type of computer-readable statement(s). For example, the terms "instructions" and "code" may refer to one or more programs, routines, sub-routines, functions, procedures, etc. "Instructions" and "code" may include a single computer-readable statement or many computer-readable statements.

The downlink scheduling and SPS control module 1108 may be implemented via hardware, software, or combinations thereof. For example, downlink scheduling and SPS control module 1108 may be implemented as a processor, circuit, and/or instructions 1106 stored in the memory 1104 and executed by the processor 1102. In some examples, the downlink scheduling and SPS control module 1108 can be integrated within the modem subsystem 1112. For example, the downlink scheduling and SPS control module 1108 can be implemented by a combination of software components (e.g., executed by a DSP or a general processor) and hardware components (e.g., logic gates and circuitry) within the modem subsystem 1112.

The downlink scheduling and SPS control module 1108 may be used for various aspects of the present disclosure, for example, aspects of FIGS. 5-10B, 13, and 15. The downlink scheduling and SPS control module 1108 is configured to communicate with other components of the UE 1100 to transmit a capability report, receive an SPS grant, process the SPS grant, monitor for SPS downlink communications based on the SPS grant, monitor for an SPS release, process the SPS release, release one or more resources based on the SPS release, monitor for one or more downlink communication(s) from a base station, perform PDCCH monitoring, perform PDSCH monitoring, transmit ACK/NACK, transmit PUCCH communications, determine whether a timer has expired, cancel a timer, determine whether a condition has occurred or is met, and/or perform other functionalities related to the power saving configurations and associated wireless communication techniques of a UE described in the present disclosure.

As shown, the transceiver 1110 may include the modem subsystem 1112 and the RF unit 1114. The transceiver 1110 can be configured to communicate bi-directionally with other devices, such as the BSs 108. The modem subsystem 1112 may be configured to modulate and/or encode the data from the memory 1104, and/or the downlink scheduling and SPS control module 1108 according to a modulation and coding scheme (MCS) (e.g., a low-density parity check (LDPC) coding scheme, a turbo coding scheme, a convolutional coding scheme, a digital beamforming scheme, etc.). The RF unit 1114 may be configured to process (e.g., perform analog to digital conversion or digital to analog conversion, etc.) modulated/encoded data (e.g., UL control information, UL data) from the modem subsystem 1112 (on outbound transmissions) or of transmissions originating from another source such as a UE 106 or a BS 108. The RF unit 1114 may be further configured to perform analog beamforming in conjunction with the digital beamforming. Although shown as integrated together in transceiver 1110, the modem subsystem 1112 and the RF unit 1114 may be separate devices that are coupled together at the UE 106 to enable the UE 106 to communicate with other devices.

The RF unit 1114 may provide the modulated and/or processed data (e.g., data packets or, more generally, data messages that may contain one or more data packets and other information) to the antennas 1116 for transmission to one or more other devices. The antennas 1116 may further receive data messages transmitted from other devices. The antennas 1116 may provide the received data messages for processing and/or demodulation at the transceiver 1110. The transceiver 1110 may provide the demodulated and decoded data (e.g., PDCCH signals, radio resource control (RRC) signals, media access control (MAC) control element (CE) signals, PDSCH signals, DL/UL scheduling grants, DL data, etc.) to the downlink scheduling and SPS control module 1108 for processing. The antennas 1116 may include multiple antennas of similar or different designs in order to sustain multiple transmission links. The RF unit 1114 may configure the antennas 1116. The RF unit 1114 and/or the transceiver 1110 may include components and/or circuitries that can be powers on and/or off dynamically for power savings. Additionally, or alternatively, the RF unit 1114 and/or the transceiver 1110 may include components and/or circuitries with multiple power states that can be configured to transition from one power state (e.g., a higher-power state) to another power state (e.g., a lower-power state) for power savings.

In an example, the UE 1100 can include multiple transceivers 1110 implementing different RATs (e.g., NR and LTE). In some instances, the UE 1100 can include a single transceiver 1110 implementing multiple RATs (e.g., NR and LTE). In some instances, the transceiver 1110 can include various components, where different combinations of components can implement different RATs.

Figure 12:
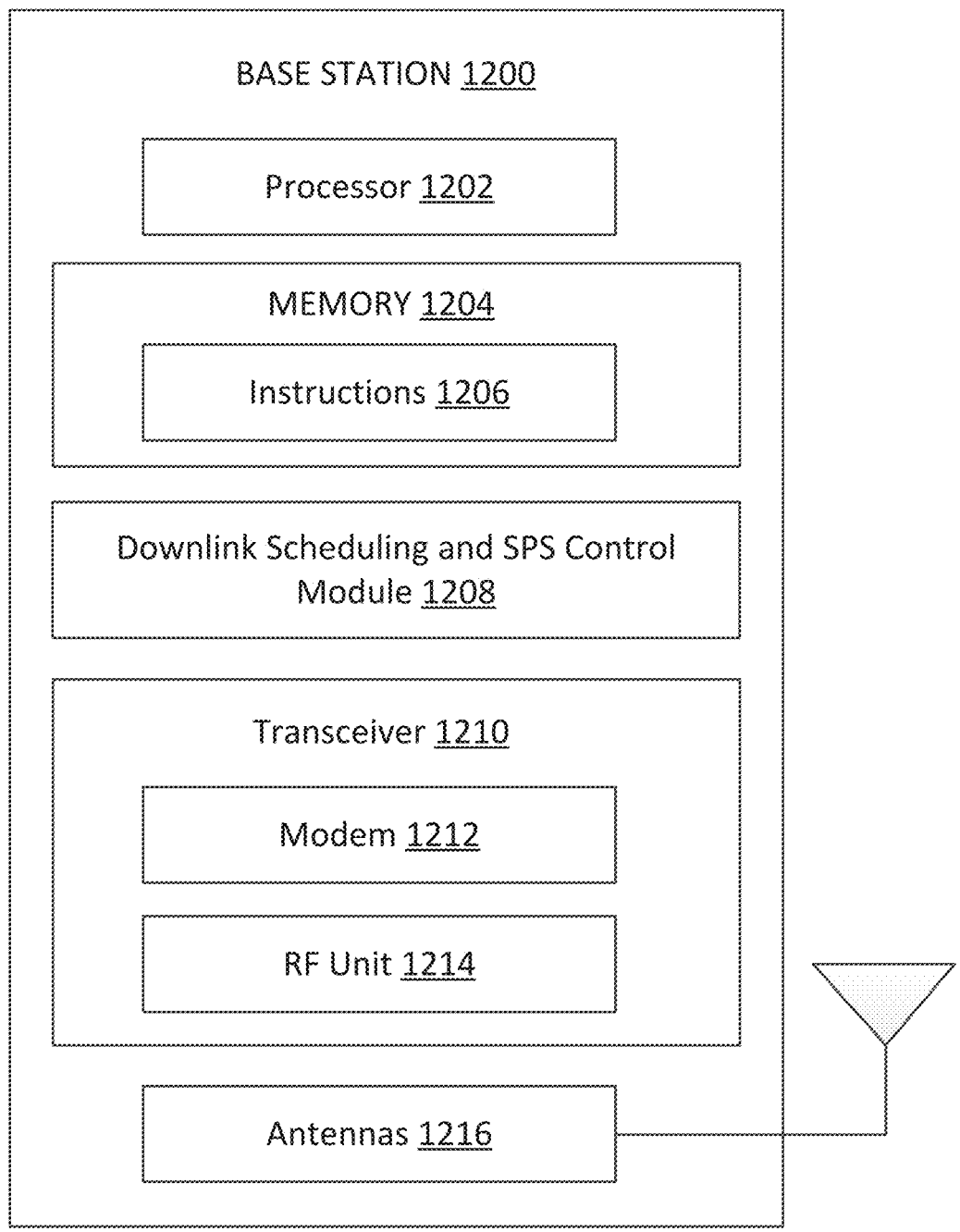
FIG. 12 is a block diagram of an exemplary base station (BS) according to aspects of the present disclosure.

FIG. 12 is a block diagram of an exemplary BS 1200 according to aspects of the present disclosure. The BS 1200 may be a BS 108 as discussed above in FIG. 1. As shown, the BS 1200 may include a processor 1202, a memory 1204, a downlink scheduling and SPS control module 1208, a transceiver 1210 including a modem subsystem 1212 and a RF unit 1214, and one or more antennas 1216. These elements may be in direct or indirect communication with each other, for example via one or more buses.

The processor 1202 may have various features as a specific-type processor. For example, these may include a CPU, a DSP, an ASIC, a controller, a FPGA device, another hardware device, a firmware device, or any combination thereof configured to perform the operations described herein. The processor 1202 may also be implemented as a combination of computing devices, e.g., a combination of a DSP and a microprocessor, a plurality of microprocessors, one or more microprocessors in conjunction with a DSP core, or any other such configuration.

The memory 1204 may include a cache memory (e.g., a cache memory of the processor 1202), RAM, MRAM, ROM, PROM, EPROM, EEPROM, flash memory, a solid state memory device, one or more hard disk drives, memristor-based arrays, other forms of volatile and non-volatile memory, or a combination of different types of memory. In some instances, the memory 1204 may include a non-transitory computer-readable medium. The memory 1204 may store instructions 1206. The instructions 1206 may include instructions that, when executed by the processor 1202, cause the processor 1202 to perform operations described herein, for example, aspects of FIGS. 5-10B and 14. Instructions 1206 may also be referred to as code, which may be interpreted broadly to include any type of computer-readable statement(s) as discussed above with respect to FIG. 5.

The downlink scheduling and SPS control module 1208 may be implemented via hardware, software, or combinations thereof. For example, the downlink scheduling and SPS control module 1208 may be implemented as a processor, circuit, and/or instructions 1206 stored in the memory 1204 and executed by the processor 1202. In some examples, the downlink scheduling and SPS control module 1208 can be integrated within the modem subsystem 1212. For example, the downlink scheduling and SPS control module 1208 can be implemented by a combination of software components (e.g., executed by a DSP or a general processor) and hardware components (e.g., logic gates and circuitry) within the modem subsystem 1212.

The downlink scheduling and SPS control module 1208 may be used for various aspects of the present disclosure, for example, aspects of FIGS. 5-10B and 14. The downlink scheduling and SPS control module 1208 can be configured to receive a capability report for one or more UEs, determine a downlink data schedule for the one or more UEs, transmit an SPS grant to one or more UEs, transmit downlink communications based on the SPS grant(s) to the one or more UEs, transmit an SPS release to the one or more UEs, transmit one or more downlink communication(s) to the one or more UEs, transmit PDCCH communications, transmit PDSCH communications, monitor for ACK/NACKs from the one or more UEs, perform PUCCH monitoring, determine whether a timer has expired, cancel a timer, determine whether a condition has occurred or is met, and/or perform other functionalities related to the power saving configurations and associated wireless communication techniques of a base station described in the present disclosure.

As shown, the transceiver 1210 may include the modem subsystem 1212 and the RF unit 1214. The transceiver 1210 can be configured to communicate bi-directionally with other devices, such as the UEs 106 and/or 1100 and/or another core network element. The modem subsystem 1212 may be configured to modulate and/or encode data according to a MCS (e.g., a LDPC coding scheme, a turbo coding scheme, a convolutional coding scheme, a digital beamforming scheme, etc.). The RF unit 1214 may be configured to process (e.g., perform analog to digital conversion or digital to analog conversion, etc.) modulated/encoded data (e.g., PDCCH signals, RRC signals, MAC CE signals, PDSCH signals, etc.) from the modem subsystem 1212 (on outbound transmissions) or of transmissions originating from another source, such as a UE 106 or 1100. The RF unit 1214 may be further configured to perform analog beamforming in conjunction with the digital beamforming. Although shown as integrated together in transceiver 1210, the modem subsystem 1212 and/or the RF unit 1214 may be separate devices that are coupled together at the BS 108 to enable the BS 108 to communicate with other devices.

The RF unit 1214 may provide the modulated and/or processed data, (e.g., data packets or, more generally, data messages that may contain one or more data packets and other information) to the antennas 1216 for transmission to one or more other devices. This may include, for example, transmission of information to a UE 106 or 1100 according to aspects of the present disclosure. The antennas 1216 may further receive data messages transmitted from other devices and provide the received data messages for processing and/or demodulation at the transceiver 1210. The transceiver 1210 may provide the demodulated and decoded data (e.g., RACH message(s), ACK/NACKs for PDCCH signals, UL data, ACK/NACKs for DL data, etc.) to the downlink scheduling and SPS control module 1208 for processing. The antennas 1216 may include multiple antennas of similar or different designs in order to sustain multiple transmission links.

In an example, the BS 1200 can include multiple transceivers 510 implementing different RATs (e.g., NR and LTE). In some instances, the BS 1200 can include a single transceiver 510 implementing multiple RATs (e.g., NR and LTE). In some instances, the transceiver 510 can include various components, where different combinations of components can implement different RATs.

Figure 13:
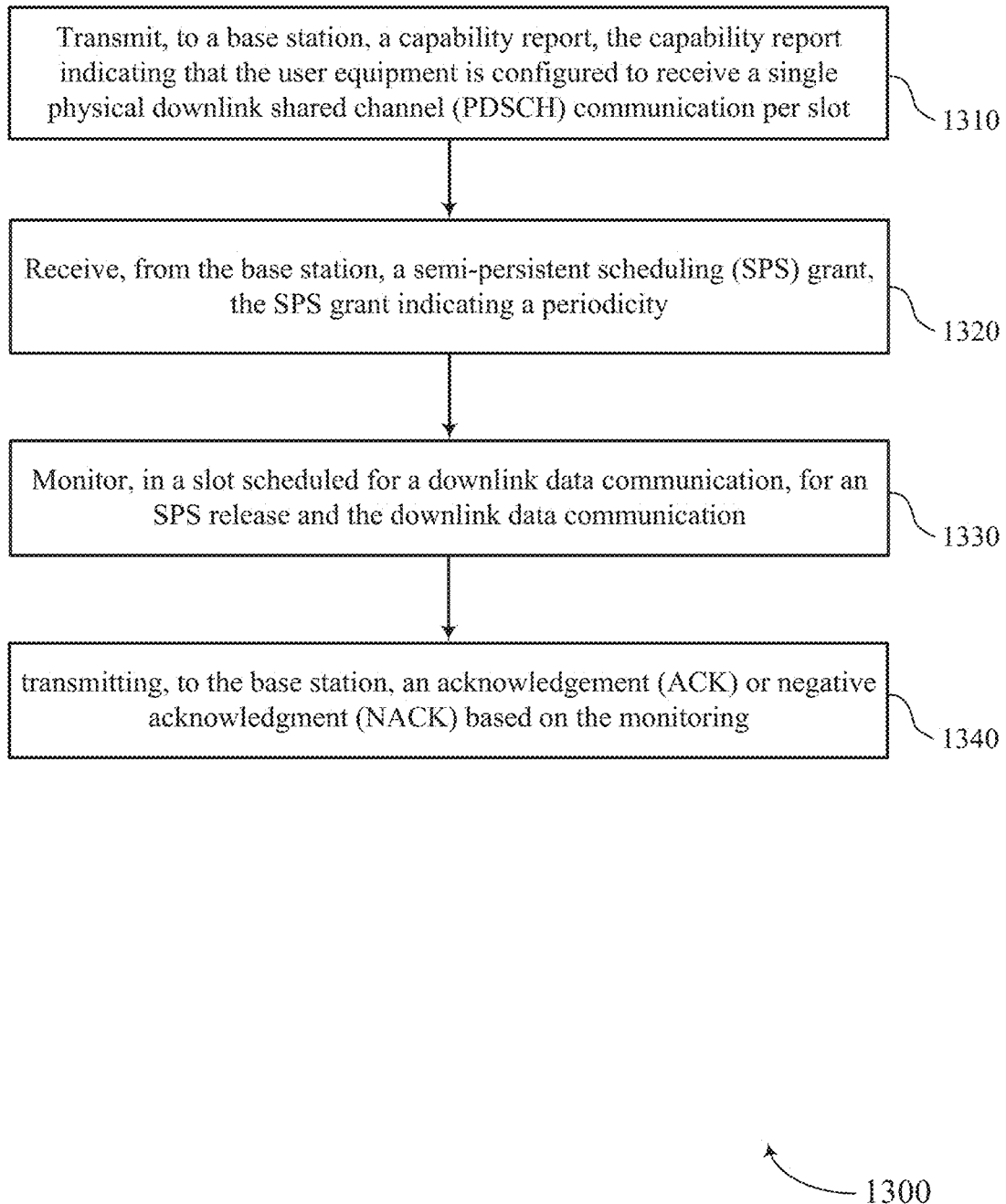
FIG. 13 illustrates a flow diagram of a wireless communication method according to some aspects of the present disclosure.

FIG. 13 is a flow diagram of a communication method 1300 according to some aspects of the present disclosure. Aspects of the method 1300 can be executed by a wireless communication device, such as the UEs 106 and/or 1100 utilizing one or more components, such as the processor 1102, the memory 1104, the downlink scheduling and SPS control module 1108, the transceiver 1110, the modem 1112, the one or more antennas 1116, and various combinations thereof. As illustrated, the method 1300 includes a number of enumerated steps, but the method 1300 may include additional steps before, after, and in between the enumerated steps. For example, in some instances one or more aspects of scheduling/transmission configurations 500, 600, 700, 800, 900, 1000, and/or 1050 may be implemented as part of method 1300. In some instances, one or more of the enumerated steps may be omitted or performed in a different order.

At step 1310, the method 1300 includes a UE transmitting, to a base station, a capability report. The UE may communicate one or more of its capabilities (e.g., single or multiple PDSCH per slot, processing parameters, etc.) to the base station in the capability report. The capability report can indicate that the user equipment is configured to receive a single physical downlink shared channel (PDSCH) communication per slot. The base station may utilize the UE's capabilities for scheduling communications with the UE in accordance with the present disclosure.

At step 1320, the method 1300 includes the UE receiving, from the base station, a semi-persistent scheduling (SPS) grant. The SPS grant can indicate a periodicity associated with the resources of the SPS grant. The periodicity of the SPS grant can range from 1 slot (or sub-slot) to 1 second or longer, including any values in between. The specific periodicity can be determined by the base station based on the type of data being communicated and its associated communication interval requirements as well as the UE's capabilities. In some instances, the periodicity is one slot.

At step 1330, the method 1300 includes the UE monitoring, in a slot scheduled for a downlink data communication, for an SPS release and the downlink data communication. In some instances, the UE monitors for the SPS release over a PDCCH and monitors for the downlink data communication over a PDSCH (see, e.g., FIGS. 6-9).

At step 1340, the method 1300 includes the UE transmitting, to the base station, an acknowledgement (ACK) or negative acknowledgment (NACK) based on the monitoring at step 1330. In some instances, the ACK/NACK timing for the SPS release and the scheduled downlink data communication are aligned. For example, the ACK/NACK for the SPS release can be scheduled for the same slot (or sub-slot) of a physical uplink control channel (PUCCH) as the ACK/NACK for the scheduled downlink data communication. The scheduled downlink data communication may be for dynamic downlink data or SPS downlink data.

In some instances, the slot is scheduled for a dynamic downlink data communication. In this regard, with the dynamic downlink data communication scheduled in the slot, the UE may detect the SPS release when monitoring at step 1330. At step 1340, the UE can transmit an ACK/NACK based on a decoding result for the SPS release detected during the slot scheduled for the dynamic downlink data communication.

In some instances, the slot scheduled for the downlink data communication is scheduled for an SPS downlink data communication. The slot scheduled for the SPS downlink data communication may be associated with the SPS grant received at step 1320 or a different SPS grant of the UE. With the slot scheduled for an SPS downlink data communication, the monitoring for the SPS release and the downlink data communication can result in receiving the SPS release indicating to the UE to release one or more resources associated with the SPS grant received at step 1320 or to release one or more resources associated with a different SPS grant of the UE.

In some instances, the monitoring for the SPS release and the downlink data communication at step 1330 includes detecting the SPS release on a physical downlink control channel (PDCCH) and the transmitting the ACK or the NACK at step 1340 includes transmitting the ACK based on successfully decoding the detected SPS release. In some instances, the SPS release is received prior to or concurrent with one or more symbols of the slot scheduled for the downlink data communication. In some instances, the SPS release is received at least n symbols (n≥0) prior to a scheduled start symbol for the downlink data communication.

In some instances, the receiving the SPS grant at step 1320 includes receiving an indication of a first ACK/NACK feedback timing for SPS downlink data communications associated with the SPS grant and the receiving the SPS release includes receiving an indication of a second ACK/NACK feedback timing for the SPS release. The second ACK/NACK feedback timing can be aligned with the first ACK/NACK feedback timing. In this regard, the first ACK/NACK feedback timing can schedule an ACK/NACK for the SPS downlink data communications received on a physical downlink shared channel (PDSCH) for a slot (or sub-slot) of a physical uplink control channel (PUCCH) and the second ACK/NACK feedback timing can schedule an ACK/NACK for the SPS release received on the PDCCH for the same slot (or sub-slot) of the PUCCH.

In some instances, the monitoring for the SPS release and the downlink data communication at step 1330 includes not successfully decoding the downlink data communication. For example, when the UE receives the SPS release the UE may not detect and/or successfully decode the scheduled downlink data communication.

In some instances, the monitoring for the SPS release and the downlink data communication at step 1330 includes detecting the downlink data communication and not detecting the SPS release and the transmitting the ACK/NACK at step 1340 includes transmitting the ACK or the NACK based on a result of decoding the downlink data communication.

In some instances, the monitoring for the SPS release and the downlink data communication at step 1330 includes not detecting the SPS release and not detecting the downlink data communication; and the transmitting the ACK/NACK at step 1340 includes transmitting the NACK.

Figure 14:
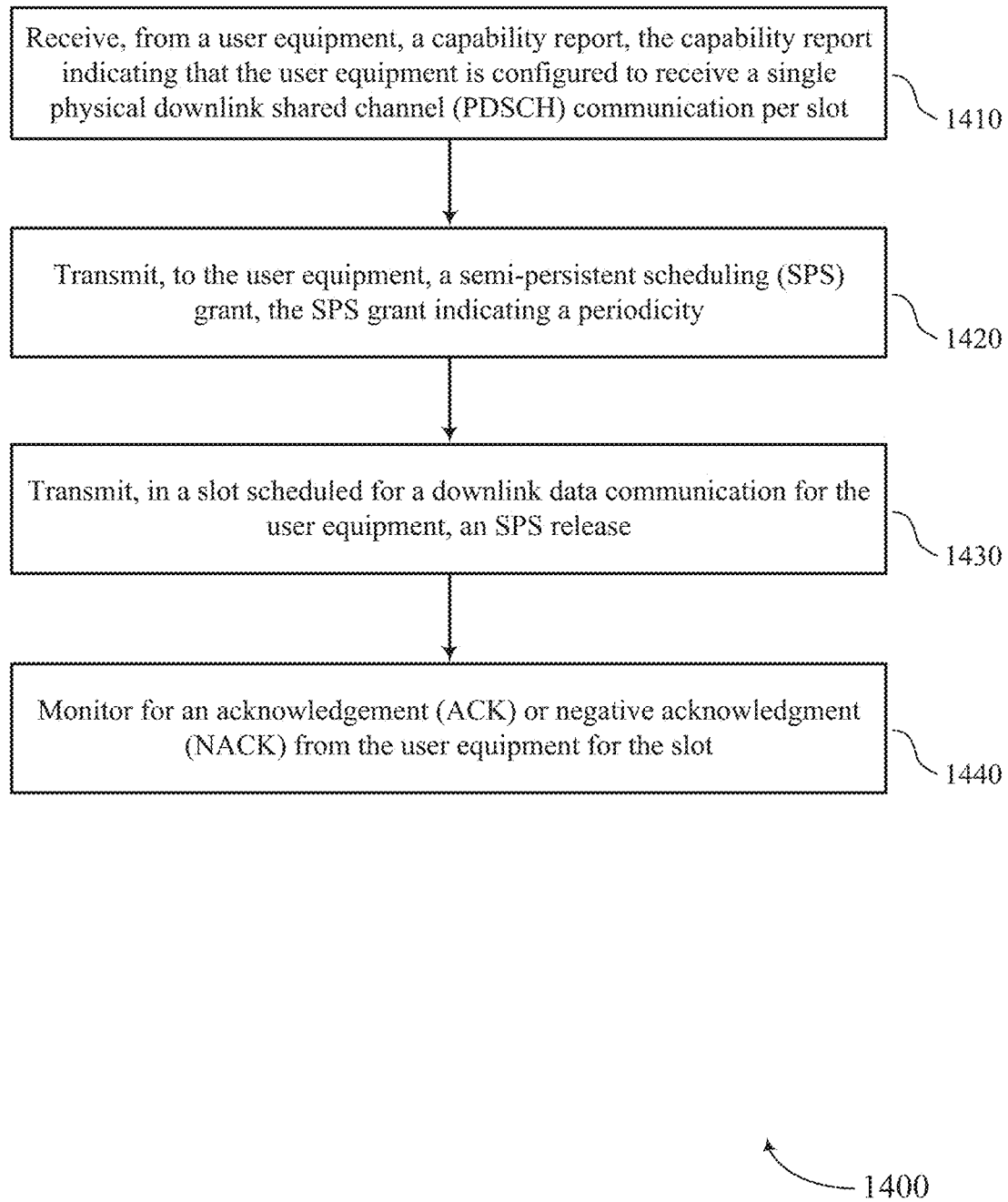
FIG. 14 illustrates a flow diagram of a wireless communication method according to some aspects of the present disclosure.

FIG. 14 is a flow diagram of a communication method 1400 according to some aspects of the present disclosure. Aspects of the method 1400 can be executed by a wireless communication device, such as the BSs 108 and/or 1200 utilizing one or more components, such as the processor 1202, the memory 1204, the downlink scheduling and SPS control module 1208, the transceiver 1210, the modem 1212, the one or more antennas 1216, and various combinations thereof. As illustrated, the method 1400 includes a number of enumerated steps, but the method 1400 may include additional steps before, after, and in between the enumerated steps. For example, in some instances one or more aspects of scheduling/transmission configurations 500, 600, 700, 800, 900, 1000, and/or 1050 may be implemented as part of method 1400. In some instances, one or more of the enumerated steps may be omitted or performed in a different order.

At step 1410, the method 1400 includes the base station receiving, from a user equipment, a capability report. The UE may indicate one or more of its capabilities (e.g., single or multiple PDSCH per slot, processing parameters, etc.) to the base station in the capability report. In some instances, the capability report indicates that the user equipment is configured to receive a single physical downlink shared channel (PDSCH) communication per slot. The base station may utilize the UE's capabilities for scheduling communications with the UE in accordance with the present disclosure.

At step 1420, the method 1400 includes the base station transmitting, to the user equipment, a semi-persistent scheduling (SPS) grant, the SPS grant indicating a periodicity associated with the resources of the SPS grant. The periodicity of the SPS grant can range from 1 slot (or sub-slot) to 1 second or longer, including any values in between. The specific periodicity can be determined by the base station based on the type of data being communicated and its associated communication interval requirements as well as the UE's capabilities. In some instances, the periodicity is one slot.

At step 1430, the method 1400 includes the base station transmitting, in a slot scheduled for a downlink data communication for the user equipment, an SPS release. The SPS release can be transmitted on a physical downlink control channel (PDCCH). In some instances, the base station refrains from transmitting physical downlink shared channel (PDSCH) communications-including any scheduled communications—in the same slot the SPS release is transmitted (See, e.g., FIGS. 6-9).

At step 1440, the method 1400 includes the base station monitoring for an acknowledgement (ACK) or negative acknowledgment (NACK) from the user equipment for the slot. In some instances, the ACK/NACK timing for the SPS release and the scheduled downlink data communication are aligned. For example, the ACK/NACK for the SPS release can be scheduled for the same slot (or sub-slot) of a physical uplink control channel (PUCCH) as the ACK/NACK for the scheduled downlink data communication. The scheduled downlink data communication may be for dynamic downlink data or SPS downlink data.

Figure 15:
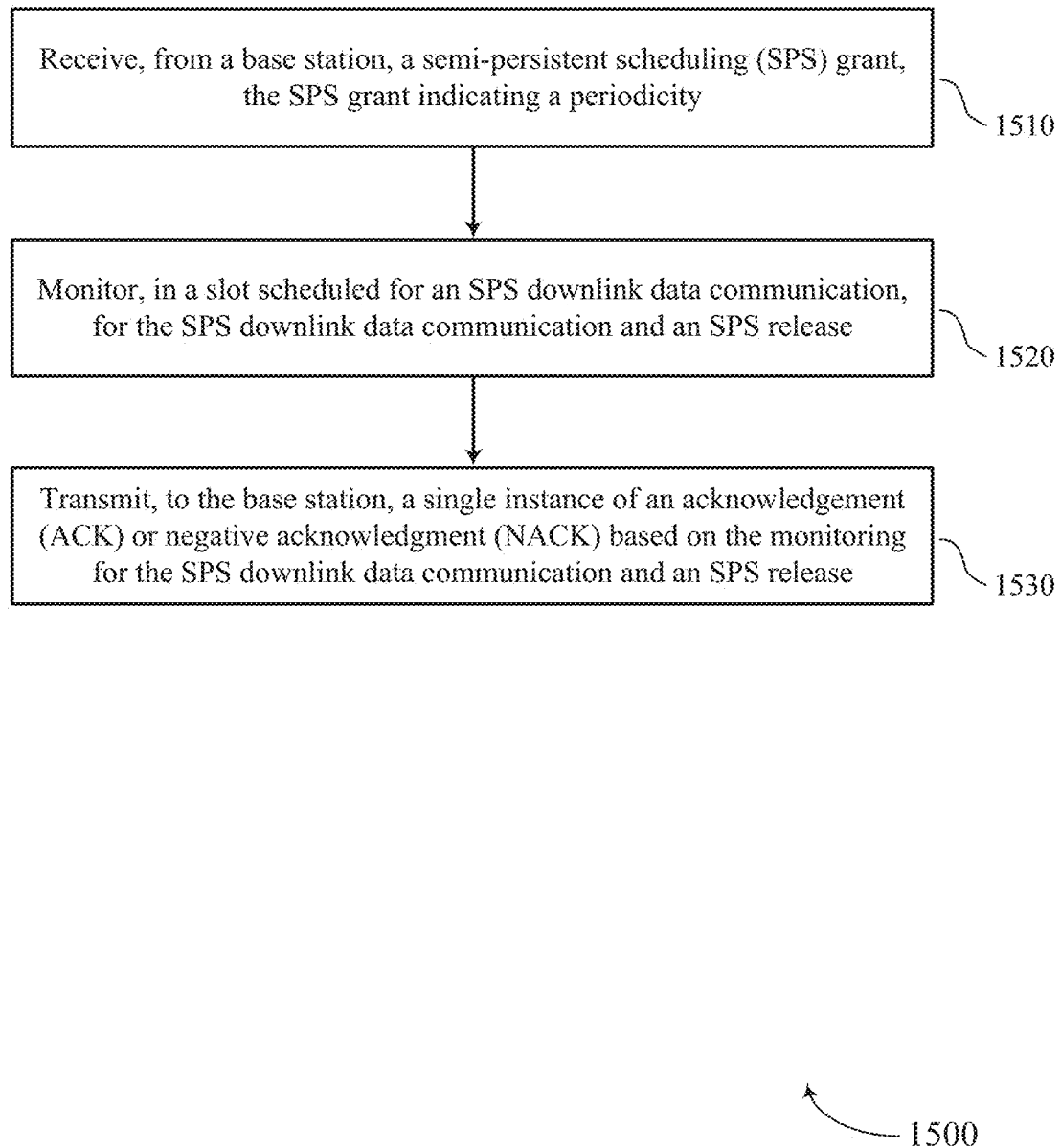
FIG. 15 illustrates a flow diagram of a wireless communication method according to some aspects of the present disclosure.

FIG. 15 is a flow diagram of a communication method 1500 according to some aspects of the present disclosure. Aspects of the method 1500 can be executed by a wireless communication device, such as the UEs 106 and/or 1100 utilizing one or more components, such as the processor 1102, the memory 1104, the downlink scheduling and SPS control module 1108, the transceiver 1110, the modem 1112, the one or more antennas 1116, and various combinations thereof. As illustrated, the method 1500 includes a number of enumerated steps, but the method 1500 may include additional steps before, after, and in between the enumerated steps. For example, in some instances one or more aspects of scheduling/transmission configurations 500, 600, 700, 800, 900, 1000, and/or 1050 may be implemented as part of method 1500. In some instances, one or more of the enumerated steps may be omitted or performed in a different order.

At step 1510, the method 1500 includes the UE receiving, from a base station, a semi-persistent scheduling (SPS) grant. The SPS grant can indicate a periodicity associated with the resources of the SPS grant. The periodicity of the SPS grant can range from 1 slot (or sub-slot) to 1 second or longer, including any values in between. The specific periodicity can be determined by the base station based on the type of data being communicated and its associated communication interval requirements as well as the UE's capabilities. In some instances, the periodicity is one slot. Further, in some instances the UE is configured to receive multiple physical downlink shared channel (PDSCH) communications per slot. In some instances, the UE is configured to receive a single PDSCH communication per slot.

At step 1520, the method 1500 includes the UE monitoring, in a slot scheduled for an SPS downlink data communication, for the SPS downlink data communication and an SPS release. In some instances, the UE monitors for the SPS release over a PDCCH and monitors for the SPS downlink data communication over a PDSCH (see, e.g., FIGS. 6-9). In some instances, the SPS release is received on the PDCCH in the slot at least a threshold number of symbols before a scheduled start symbol in the slot for the SPS downlink data communication on the PDSCH. In some instances, the threshold number of symbols is based at least in part on a processing capability of the user equipment (PDSCH processing time, PUCCH processing time, available processing resources, etc.).

At step 1530, the method 1500 includes the UE transmitting, to the base station, a single instance of an acknowledgement (ACK) or negative acknowledgment (NACK) based on the monitoring for the SPS downlink data communication and an SPS release. In some instances, the ACK/NACK timing for the SPS release and the scheduled downlink data communication are aligned. For example, the ACK/NACK for the SPS release can be scheduled for the same slot (or sub-slot) of a physical uplink control channel (PUCCH) as the ACK/NACK for the scheduled SPS downlink data communication.

Some aspects of the present disclosure disclose a method of wireless communication performed by a base station, the method comprising: transmitting, to the user equipment, a semi-persistent scheduling (SPS) grant, the SPS grant indicating a periodicity; transmitting, in a slot scheduled for a downlink data communication for the user equipment, an SPS release; and monitoring for an acknowledgement (ACK) or negative acknowledgment (NACK) from the user equipment for the slot.

In some aspects, the periodicity is one slot.

In some aspects, the slot scheduled for the downlink data communication is scheduled for a dynamic downlink data communication. In some instances, the downlink data communication is a dynamic downlink data communication scheduled by a dynamic grant downlink control information (DCI).

In some aspects, the method further comprises: transmitting, to the user equipment in the slot, the dynamic downlink data communication; and wherein the ACK or the NACK indicates whether the UE received the transmitted SPS release.

In some aspects, the slot scheduled for the downlink data communication is scheduled for an SPS downlink data communication.

In some aspects, the slot scheduled for the SPS downlink data communication is associated with the SPS grant. In some instances, the downlink data communication is an SPS downlink data communication scheduled by the SPS grant.

In some aspects, the slot scheduled for the SPS downlink data communication is associated with a different SPS grant. In some instances, the downlink data communication is an SPS downlink data communication scheduled by the different SPS grant.

In some aspects, the SPS release indicates to the user equipment to release one or more resources associated with the SPS grant.

In some aspects, the SPS release indicates to the user equipment to release one or more resources associated with a different SPS grant.

In some aspects, the monitoring for the ACK or the NACK includes receiving the ACK, the ACK acknowledging the SPS release.

In some aspects, the method further comprises: transmitting, to the user equipment in the slot, the downlink data communication; and determining, based on the ACK acknowledging the SPS release, the downlink data communication was not successfully received by the user equipment.

In some aspects, the transmitting the SPS release includes transmitting the SPS release prior to or concurrent with one or more symbols of the slot scheduled for the downlink data communication. In some instances, the SPS release is received prior to an end of a last symbol of the downlink data communication.

In some aspects, the transmitting the SPS release includes transmitting the SPS release at least n symbols prior to a scheduled start symbol for the downlink data communication.

In some aspects, the transmitting the SPS grant includes transmitting an indication of a first ACK/NACK feedback timing for SPS downlink data communications associated with the SPS grant; and the transmitting the SPS release includes transmitting an indication of a second ACK/NACK feedback timing for the SPS release, wherein the second ACK/NACK feedback timing is aligned with the first ACK/NACK feedback timing.

In some aspects, the first ACK/NACK feedback timing schedules an ACK/NACK for the SPS downlink data communications received on a physical downlink shared channel (PDSCH) for a first slot of a physical uplink control channel (PUCCH); and the second ACK/NACK feedback timing schedules an ACK/NACK for the SPS release received on the PDCCH for the first slot of the PUCCH.

In some aspects, the monitoring for the ACK or the NACK includes receiving the NACK indicating the SPS release was not successfully decoded by the user equipment.

In some aspects, the monitoring for the ACK or the NACK includes: receiving, from the user equipment, a one-bit ACK/NACK.

In some aspects, the method further comprises: refraining from transmitting, for a time period following the transmitting the SPS release, a further downlink data communication for the user equipment using a resource associated with the SPS grant.

Some aspects of the present disclosure disclose a method of wireless communication performed by a user equipment, the method comprising: receiving, from a base station, a semi-persistent scheduling (SPS) grant, the SPS grant indicating a periodicity; monitoring, in a slot scheduled for an SPS downlink data communication, for the SPS downlink data communication and an SPS release; and transmitting, to the base station, a single instance of an acknowledgement (ACK) or negative acknowledgment (NACK) based on the monitoring for the SPS downlink data communication and an SPS release.

In some aspects, the user equipment is configured to receive multiple physical downlink shared channel (PDSCH) communications per slot.

In some aspects, the monitoring for the SPS release and the SPS downlink data communication includes: receiving the SPS release, the SPS release indicating to the user equipment to release one or more resources associated with the SPS grant.

In some aspects, the receiving the SPS grant includes receiving an indication of a first ACK/NACK feedback timing for SPS downlink data communications associated with the SPS grant including the SPS downlink data communication; and the receiving the SPS release includes receiving an indication of a second ACK/NACK feedback timing for the SPS release, wherein the second ACK/NACK feedback timing is aligned with the first ACK/NACK feedback timing.

In some aspects, the first ACK/NACK feedback timing schedules an ACK/NACK for the SPS downlink data communications received on a physical downlink shared channel (PDSCH) for a first slot of a physical uplink control channel (PUCCH); and the second ACK/NACK feedback timing schedules an ACK/NACK for the SPS release received on the PDCCH for the first slot of the PUCCH.

In some aspects, the SPS release is received on a physical downlink control channel (PDCCH) in the slot at least a threshold number of symbols before a scheduled start symbol in the slot for the SPS downlink data communication on a physical downlink shared channel (PDSCH).

In some aspects, the threshold number of symbols is based at least in part on a PDSCH processing capability of the user equipment.

In some aspects, the downlink data communication is an SPS downlink data communication scheduled by the SPS grant; the monitoring for the SPS release and the downlink data communication includes failing to successfully decode the downlink data communication; and the transmitting the ACK or the NACK includes failing to transmit the ACK or the NACK as a result of the failing to successfully decode the downlink data communication.

Some aspects of the present disclosure disclose a user equipment, comprising: means for receiving, from the base station, a semi-persistent scheduling (SPS) grant, the SPS grant indicating a periodicity; means for monitoring, in a slot scheduled for a downlink data communication, for an SPS release and the downlink data communication; and means for transmitting, to the base station, an acknowledgement (ACK) or negative acknowledgment (NACK) based on the monitoring.

Some aspects of the present disclosure disclose a base station, comprising: means for transmitting, to the user equipment, a semi-persistent scheduling (SPS) grant, the SPS grant indicating a periodicity; means for transmitting, in a slot scheduled for a downlink data communication for the user equipment, an SPS release; and means for monitoring for an acknowledgement (ACK) or negative acknowledgment (NACK) from the user equipment for the slot.

Some aspects of the present disclosure disclose a user equipment, comprising: means for receiving, from a base station, a semi-persistent scheduling (SPS) grant, the SPS grant indicating a periodicity; means for monitoring, in a slot scheduled for an SPS downlink data communication, for the SPS downlink data communication and an SPS release; and means for transmitting, to the base station, a single instance of an acknowledgement (ACK) or negative acknowledgment (NACK) based on the monitoring for the SPS downlink data communication and an SPS release.

Some aspects of the present disclosure disclose a non-transitory computer-readable medium having program code recorded thereon for wireless communication by a user equipment, the program code comprising: code for causing the user equipment to receive, from the base station, a semi-persistent scheduling (SPS) grant, the SPS grant indicating a periodicity; code for causing the user equipment to monitor, in a slot scheduled for a downlink data communication, for an SPS release and the downlink data communication; and code for causing the user equipment to transmit, to the base station, an acknowledgement (ACK) or negative acknowledgment (NACK) based on the monitoring.

Some aspects of the present disclosure disclose a non-transitory computer-readable medium having program code recorded thereon for wireless communication by a base station, the program code comprising: code for causing the base station to transmit, to the user equipment, a semi-persistent scheduling (SPS) grant, the SPS grant indicating a periodicity; code for causing the base station to transmit, in a slot scheduled for a downlink data communication for the user equipment, an SPS release; and code for causing the base station to monitor for an acknowledgement (ACK) or negative acknowledgment (NACK) from the user equipment for the slot.

Some aspects of the present disclosure disclose a non-transitory computer-readable medium having program code recorded thereon for wireless communication by a user equipment, the program code comprising: code for causing the user equipment to receive, from a base station, a semi-persistent scheduling (SPS) grant, the SPS grant indicating a periodicity; code for causing the user equipment to monitor, in a slot scheduled for an SPS downlink data communication, for the SPS downlink data communication and an SPS release; and code for causing the user equipment to transmit, to the base station, a single instance of an acknowledgement (ACK) or negative acknowledgment (NACK) based on the monitoring for the SPS downlink data communication and an SPS release.

Several aspects of a wireless communication network have been presented with reference to an exemplary implementation. As those skilled in the art will readily appreciate, various aspects described throughout this disclosure may be extended to other telecommunication systems, network architectures and communication standards.

By way of example, various aspects may be implemented within other systems defined by 3GPP, such as Long-Term Evolution (LTE), the Evolved Packet System (EPS), the Universal Mobile Telecommunication System (UMTS), and/or the Global System for Mobile (GSM). Various aspects may also be extended to systems defined by the 3rd Generation Partnership Project 2 (3GPP2), such as CDMA2000 and/or Evolution-Data Optimized (EV-DO). Other examples may be implemented within systems employing IEEE 802.11 (Wi-Fi), IEEE 802.16 (WiMAX), IEEE 802.20, Ultra-Wideband (UWB), Bluetooth, and/or other suitable systems. The actual telecommunication standard, network architecture, and/or communication standard employed will depend on the specific application and the overall design constraints imposed on the system.

Within the present disclosure, the word "exemplary" is used to mean "serving as an example, instance, or illustration." Any implementation or aspect described herein as "exemplary" is not necessarily to be construed as preferred or advantageous over other aspects of the disclosure. Likewise, the term "aspects" does not require that all aspects of the disclosure include the discussed feature, advantage or mode of operation. The term "coupled" is used herein to refer to the direct or indirect coupling between two objects. For example, if object A physically touches object B, and object B touches object C, then objects A and C may still be considered coupled to one another-even if they do not directly physically touch each other. For instance, a first object may be coupled to a second object even though the first object is never directly physically in contact with the second object. The terms "circuit" and "circuitry" are used broadly, and intended to include both hardware implementations of electrical devices and conductors that, when connected and configured, enable the performance of the functions described in the present disclosure, without limitation as to the type of electronic circuits, as well as software implementations of information and instructions that, when executed by a processor, enable the performance of the functions described in the present disclosure.

One or more of the components, steps, features and/or functions illustrated in FIGS. 1-15 may be rearranged and/or combined into a single component, step, feature or function or embodied in several components, steps, or functions. Additional elements, components, steps, and/or functions may also be added without departing from novel features disclosed herein. The apparatus, devices, and/or components illustrated in FIGS. 1-15 may be configured to perform one or more of the methods, features, or steps described herein. The novel algorithms described herein may also be efficiently implemented in software and/or embedded in hardware.

It is to be understood that the specific order or hierarchy of steps in the methods disclosed is an illustration of exemplary processes. Based upon design preferences, it is understood that the specific order or hierarchy of steps in the methods may be rearranged. The accompanying method claims present elements of the various steps in a sample order, and are not meant to be limited to the specific order or hierarchy presented unless specifically recited therein.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but are to be accorded the full scope consistent with the language of the claims, wherein reference to an element in the singular is not intended to mean "one and only one" unless specifically so stated, but rather "one or more." Unless specifically stated otherwise, the term "some" refers to one or more. A phrase referring to "at least one of" a list of items refers to any combination of those items, including single members. As an example, "at least one of: a, b, or c" is intended to cover: a; b; c; a and b; a and c; b and c; and a, b and c. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112(f) unless the element is expressly recited using the phrase "means for" or, in the case of a method claim, the element is recited using the phrase "step for."

What is claimed is:

1. A method of wireless communication performed by a user equipment, the method comprising:
   receiving, from a base station, a semi-persistent scheduling (SPS) grant, the SPS grant indicating a periodicity;
   monitoring, in a first slot scheduled for a downlink data communication, for an SPS release and the downlink data communication, wherein the downlink data communication is scheduled in a first SPS resource in the first slot, wherein a first physical uplink control channel (PUCCH) resource in a second slot is scheduled to provide a first hybrid automatic repeat request acknowledgement (HARQ-ACK) for the downlink data communication, and wherein the monitoring comprises receiving the SPS release prior to an end of a last symbol of the downlink data communication in the first slot;
   refraining, based on receiving the SPS release prior to the end of the last symbol of the downlink data communication in the first slot:

from decoding the downlink data communication in the first slot; and from transmitting the first HARQ-ACK for the downlink data communication in the first PUCCH resource in the second slot; and transmitting, to the base station in the first PUCCH resource scheduled to provide the first HARQ-ACK for the downlink data communication, and instead of the first HARQ-ACK for the downlink data communication, a second HARQ-ACK for the SPS release, wherein the transmitting the second HARQ-ACK is based on the receiving the SPS release prior to the end of the last symbol of the downlink data communication.

2. The method of claim 1, wherein the periodicity is one slot.

3. The method of claim 1, wherein the downlink data communication is a dynamic downlink data communication scheduled by a dynamic grant downlink control information (DCI).

4. The method of claim 3, wherein:
the monitoring for the SPS release and the downlink data communication includes detecting the SPS release; and
the transmitting the second HARQ-ACK includes transmitting the second HARQ-ACK based on a decoding result for the SPS release.

5. The method of claim 1, wherein the SPS release indicating indicates to the user equipment to release one or more resources associated with the SPS grant.

6. The method of claim 1, wherein the downlink data communication is an SPS downlink data communication scheduled by the SPS grant.

7. The method of claim 6, wherein:
the monitoring for the SPS release and the downlink data communication includes detecting the SPS release on a physical downlink control channel (PDCCH); and
the transmitting the second HARQ-ACK includes transmitting the second HARQ-ACK based on successfully decoding the detected SPS release.

8. The method of claim 6, wherein the SPS release is received at least n symbols prior to a scheduled start symbol for the downlink data communication.

9. The method of claim 6, wherein:
the receiving the SPS grant includes receiving an indication of a first HARQ-ACK feedback timing for SPS downlink data communications associated with the SPS grant; and
the receiving the SPS release includes receiving an indication of a second HARQ-ACK feedback timing for the SPS release, wherein the second HARQ-ACK feedback timing is aligned with the first HARQ-ACK feedback timing.

10. The method of claim 9, wherein:
the first HARQ-ACK feedback timing schedules the first HARQ-ACK for the SPS downlink data communication received on a physical downlink shared channel (PDSCH) in the second slot; and
the second HARQ-ACK feedback timing schedules the second HARQ-ACK for the SPS release received on a physical downlink control channel (PDCCH) in the second slot.

11. The method of claim 6, wherein the monitoring for the SPS release and the downlink data communication includes not successfully decoding the downlink data communication.

12. The method of claim 1, wherein:
the monitoring for the SPS release and the downlink data communication includes detecting the downlink data communication and not detecting the SPS release; and
the transmitting the second HARQ-ACK includes transmitting the second HARQ-ACK based on a result of decoding the downlink data communication.

13. The method of claim 1, wherein:
the monitoring for the SPS release and the downlink data communication includes not detecting the SPS release and not detecting the downlink data communication; and
the second HARQ-ACK comprises a non-acknowledgement (NACK) indicating that the SPS release was not detected.

14. The method of claim 1, wherein:
the transmitting the HARQ-ACK includes transmitting a one-bit HARQ-ACK in response to receiving the SPS release.

15. The method of claim 1, wherein the downlink data communication is an SPS downlink data communication scheduled by a different SPS grant.

16. The method of claim 15, wherein the SPS release indicates to the user equipment to release one or more resources associated with the different SPS grant.

17. A method of wireless communication performed by a base station, the method comprising:
transmitting, to a user equipment, a semi-persistent scheduling (SPS) grant, the SPS grant indicating a periodicity and at least a first SPS resource, the first SPS resource associated with a first physical uplink control channel (PUCCH) resource in a second slot;

transmitting, in a first slot scheduled for a downlink data communication for the user equipment and prior to an end of a last symbol of the downlink data communication in the first slot, an SPS release, wherein the downlink data communication is scheduled in a first SPS resource in the first slot, wherein the first physical uplink control channel (PUCCH) resource in the second slot is scheduled for receiving a first hybrid automatic repeat request acknowledgement (HARQ-ACK) for the downlink data communication in the first slot; and receiving, from the user equipment in the first PUCCH resource scheduled for receiving the first HARQ-ACK for the downlink data communication, and instead of the first HARQ-ACK for the downlink data communication, a second HARQ-ACK for the SPS release, wherein the receiving the second HARQ-ACK for the SPS release is based on the user equipment receiving the SPS release prior to the end of the last symbol of the downlink data communication in the first slot, and the user equipment refraining from decoding the downlink data communication in the first slot, and the user equipment refraining from transmitting the first HARQ-ACK for the downlink data communication in the first PUCCH resource in the second slot.

18. The method of claim 17, wherein:
the SPS grant indicates a first HARQ-ACK feedback timing for SPS downlink data communications associated with the SPS grant, wherein the first HARQ-ACK feedback timing schedules the first HARQ-ACK for the SPS downlink data communications received on a physical downlink shared channel (PDSCH) in the second slot; and the SPS release indicates a second HARQ-ACK feedback timing for the SPS release, wherein the second HARQ- ACK feedback timing is aligned with the first HARQ-ACK feedback timing and schedules the second HARQ-ACK for the SPS release received on a PDCCH in the second slot.

19. The method of any of claim 17, wherein the receiving the second HARQ-ACK includes:
receiving, from the user equipment, a one-bit HARQ-ACK in response to the transmitting the SPS release.

20. A user equipment, comprising:
a transceiver configured to:
receive, from a base station, a semi-persistent scheduling (SPS) grant, the SPS grant indicating a periodicity; and
a processor in communication with the transceiver, the processor configured to:
monitor, in a first slot scheduled for a downlink data communication, for an SPS release and the downlink data communication, wherein the downlink data communication is scheduled in a first SPS resource in the first slot, wherein a first physical uplink control channel (PUCCH) resource in a second slot is scheduled to provide a first hybrid automatic repeat request acknowledgement (HARQ-ACK) for the downlink data communication, and wherein the monitoring comprises receiving the SPS release prior to an end of a last symbol of the downlink data communication in the first slot;
wherein the transceiver is further configured to:
refrain, based on receiving the SPS release prior to the end of the last symbol of the downlink data communication in the first slot:
from decoding the downlink data communication in the first slot; and
from transmitting the first HARQ-ACK for the downlink data communication in the first PUCCH resource in the second slot; and
transmit, to the base station in the first PUCCH resource scheduled to provide the first HARQ-ACK for the downlink data communication, and instead of the first HARQ-ACK for the downlink data communication, a second HARQ-ACK for the SPS release, wherein the transmitting the second HARQ-ACK is based on the receiving the SPS release prior to the end of the last symbol of the downlink data communication.

21. The user equipment of claim 20, wherein:
the downlink data communication is an SPS downlink data communication scheduled by the SPS grant.

22. The user equipment of claim 20, wherein the transceiver configured to transmit the second HARQ-ACK comprises the transceiver configured to transmit a one-bit HARQ-ACK in response to receiving the SPS release.

23. A base station, comprising:
a processor; and
a transceiver in communication with the processor, the transceiver configured to:
transmit, to a user equipment, a semi-persistent scheduling (SPS) grant, the SPS grant indicating a periodicity and at least a first SPS resource, the first SPS resource associated with a first physical uplink control channel (PUCCH) resource in a second slot;
transmit, in a first slot scheduled for a downlink data communication for the user equipment and prior to an end of a last symbol of the downlink data communication in the first slot, an SPS release, wherein the downlink data communication is scheduled in a first SPS resource in the first slot, wherein the first physical uplink control channel (PUCCH) resource in the second slot is scheduled for receiving a first hybrid automatic repeat request acknowledgement (HARQ-ACK) for the downlink data communication in the first slot; and
receive, from the user equipment in the first PUCCH resource scheduled for receiving the first HARQ-ACK for the downlink data communication, and instead of the first HARQ-ACK for the downlink data communication, a second HARQ-ACK for the SPS release,
wherein to receive the second HARQ-ACK for the SPS release is based on the user equipment receiving the SPS release prior to the end of the last symbol of the downlink data communication in the first slot, and the user equipment ref refraining from decoding the downlink data communication in the first slot, and the user equipment refraining from transmitting the first HARQ-ACK for the downlink data communication in the first PUCCH resource in the second slot.

24. The base station of claim 23, wherein the transceiver is further configured to:
transmit an indication of a first HARQ-ACK feedback timing for SPS downlink data communications associated with the SPS grant, wherein the first HARQ-ACK feedback timing schedules the first HARQ-ACK for the SPS downlink data communications received on a physical downlink shared channel (PDSCH) in the second slot; and
transmit an indication of a second HARQ-ACK feedback timing for the SPS release, wherein the second HARQ-ACK feedback timing is aligned with the first HARQ-ACK feedback timing and schedules the second HARQ-ACK for the SPS release received on a PDCCH in the second slot.

25. The base station of claim 23, wherein the transceiver configured to receive the second HARQ-ACK comprises the transceiver configured to receive a one-bit HARQ-ACK in response to transmitting the SPS release.

* * * * *